(12) United States Patent
Bernardini et al.

(10) Patent No.: US 9,515,909 B2
(45) Date of Patent: Dec. 6, 2016

(54) SYSTEM AND METHOD FOR DETERMINING AND OPTIMIZING RESOURCES OF DATA PROCESSING SYSTEM UTILIZED BY A SERVICE REQUEST

(71) Applicant: International Business Machines Corporation, Armonk, NY (US)

(72) Inventors: Fausto Bernardini, New York, NY (US); Rong Nickle Chang, Pleasantville, NY (US); Perng Chang-shing, Goldens Bridge, NY (US); Karthik Gomadam, San Jose, CA (US); Chunqiang Tang, Ossining, NY (US); Tao Tao, Ossining, NY (US); Edward Cholchin So, Flushing, NY (US); Chun Zhang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 733 days.

(21) Appl. No.: 13/837,146

(22) Filed: Mar. 15, 2013

(65) Prior Publication Data

US 2013/0205023 A1 Aug. 8, 2013

Related U.S. Application Data

(63) Continuation of application No. 11/767,047, filed on Jun. 22, 2007, now Pat. No. 8,472,330.

(51) Int. Cl.
*H04L 12/26* (2006.01)
*H04L 12/24* (2006.01)

(52) U.S. Cl.
CPC ....... *H04L 43/0876* (2013.01); *H04L 12/2602* (2013.01); *H04L 41/0853* (2013.01);
(Continued)

(58) Field of Classification Search
None
See application file for complete search history.

(56) References Cited

U.S. PATENT DOCUMENTS 6,446,135 B1 * 9/2002 Koppolu ................. G06F 9/543
719/313
6,976,090 B2 12/2005 Ben-Shaul et al.
(Continued)

OTHER PUBLICATIONS

Chung et al., "An Empirical Study of the Relationships Between IT Infrastructure Flexibility, Mass Customization, and Business Performance", The Database for Advances in Information Systems—Summer 2005 (vol. 36, No. 3), pp. 26-44.
(Continued)

*Primary Examiner* — Steve Young
(74) *Attorney, Agent, or Firm* — F. Chau & Associates, LLC

(57) ABSTRACT

A computer-implemented method for determining resources utilized by a service request in a data processing system. The method includes determining monitored relationship types from monitoring data, determining relationship domains, determining intra-domain relationships from relationships that are internal to the relationship domains and determining cross-domain relationships from the intra-domain relationships that are linked between pairs of the relationship domains, and determining resources utilized by the service request from the intra-domain and cross-domain relationships. The domains are derived from one of the relationship types that is monitored by a single monitoring application.

10 Claims, 26 Drawing Sheets

(52) U.S. Cl.
CPC .......... *H04L 41/0873* (2013.01); *H04L 43/00* (2013.01); *H04L 41/0826* (2013.01); *H04L 41/22* (2013.01); *H04L 43/106* (2013.01)

(56) References Cited

U.S. PATENT DOCUMENTS

| | | | |
|---|---|---|---|
| 7,143,392 | B2 | 11/2006 | Li et al. |
| 7,197,546 | B1 | 3/2007 | Bagga et al. |
| 8,386,636 | B2* | 2/2013 | Asaki ................... G06F 9/505 709/224 |
| 2002/0051449 | A1 | 5/2002 | Iwata |
| 2004/0153533 | A1* | 8/2004 | Lewis ................... H04L 12/24 709/223 |
| 2005/0091664 | A1* | 4/2005 | Cook ................... G06F 9/4443 719/315 |
| 2005/0096949 | A1 | 5/2005 | Aiber et al. |
| 2005/0119905 | A1 | 6/2005 | Wong et al. |
| 2005/0125449 | A1 | 6/2005 | Wong et al. |
| 2005/0125768 | A1 | 6/2005 | Wong et al. |
| 2005/0172126 | A1* | 8/2005 | Lange ................... G06F 21/53 713/166 |
| 2005/0256971 | A1* | 11/2005 | Colrain ................ G06F 9/505 709/238 |
| 2006/0129419 | A1 | 6/2006 | Flaxer et al. |
| 2006/0277319 | A1 | 12/2006 | Elien et al. |
| 2007/0027970 | A1* | 2/2007 | Backman ............ H04L 41/5035 709/223 |
| 2008/0065466 | A1 | 3/2008 | Liu et al. |
| 2008/0155386 | A1* | 6/2008 | Jensen ................. G06F 9/5083 715/201 |

OTHER PUBLICATIONS

Ben-Menachem et al., "Integrated IT Management Tool Kit", Communications of the ACM, Apr. 2002, vol. 45., No. 4, pp. 96-102.
Peterson et al., "Information Technology Governance by Design: Investigating Hybrid Configurations and Integration Mechanisms", In Proceedings of the Twenty First ACM International Conference on Information Systems, 2000.
Kind et al., "Relationship Discovery with NetFlow to Enable Business-Driven IT Management", 1st IEEE/IFIP International Workshop on Business-Driven IT Management (BDIM), Apr. 2006.
Aguilera et al., "Performance Debugging for Distributed Systems of Black Boxes", SOSP'03, Oct. 19-22, 2003, Bolton Landing, New York.

* cited by examiner

SYSTEM AND METHOD FOR DETERMINING AND OPTIMIZING RESOURCES OF DATA PROCESSING SYSTEM UTILIZED BY A SERVICE REQUEST

CROSS-REFERENCE TO RELATED APPLICATIONS

This application is a Continuation of U.S. application Ser. No. 11/767,047 filed on Jun. 22, 2007, which is incorporated by reference herein in its entirety.

TECHNICAL FIELD OF THE INVENTION

The present disclosure relates generally to the managing of Information Technology (IT) resources, and more specifically to a system and method for determining and optimizing resources utilized by a service request.

BACKGROUND

Businesses and organizations strive to maximize the strategic value and operational efficiency of their IT infrastructure. Money invested in IT transformation needs to be clearly justified by the expected business advantage it will create. In a world of globally distributed and remotely managed IT systems, frequent mergers and acquisitions, and rapidly evolving business priorities, there is an increasing need to monitor, manage and analyze how business processes utilize IT resources in an integrated and timely manner. While solutions exist for monitoring IT resource utilization/performance or provisioning business process performance dashboards, the ability to dynamically associate IT service operations data across layers of business processes and value models, applications, and hardware infrastructure is not currently available.

Lacking a good means of monitoring and controlling instance-based cross-layer relationships limits an organization's ability to optimize its business performance. For example, minimizing IT operating cost by isolating, simplifying and/or transforming an IT system without compromising any user experience management standard at a business process level requires deep insights about dynamic cross-layer relationships. Prioritizing and reacting to IT infrastructure management incidents (e.g., server failure) based upon process-level key performance/risk indicators (KPIs/KRIs) or contractual service level agreements (SLAs) require analyzing dynamic instance-based relationships in a timely manner. Competitively reducing problem determination time for business process/transaction incidents can be done by exploiting the historical data on the cross-layer relationships.

However, it is non-trivial to discover dynamic cross-layer utilization relationships between the managed IT resources without the ability of accessing and changing the source code of the software in use. Such non-triviality can well be appreciated via a Service Oriented Architecture (SOA) based IT infrastructure, in which functional capabilities of every network-based distributed computing component can be externalized via one or more "service" interfaces such as, for example, the Web Services interfaces specified via Web Service Definition Language (WSDL). Business Process Execution Language (BPEL) based process choreography engines are usually used to codify, realize, and automate actionable business process flows and to dynamically orchestrate the execution of the service components.

It can be advantageous for the owner of a service oriented IT infrastructure to timely determine how a specific external Web Service invocation, issued by a customer, utilizes the managed networked servers in the infrastructure. For example, such utilization information may enable the owner to competitively leverage IT in business terms.

Web Service invocations can be monitored by contemporary IT monitoring/metering products such as, for example, IBM Tivoli Composition Application Monitor for SOA (ITCAM for SOA). The runtime status of all of the process choreography entities can be obtained via contemporary middleware products, such as, for example, IBM WebSphere Process Server (WPS). However, the owner cannot easily determine (or discover) the utilization relationships between the Web Service invocations and the managed servers.

Monitoring and metering data are logged at various levels and at different machines. It is non-trivial to get an integrated view of all the relevant data due to the lack of standards on how to correlate those data. For example, there are no standards in correlating the relationships between BPEL workflow execution entities, Web Service invocations, and server CPU utilization data.

In addition, data is formatted differently by different tools. There are no standards on the needed monitoring data in terms of format and semantics. For example, each WPS CBE (Common Base Event) event is an XML-formatted message, whereas each ITCAM for SOA log entry is a delimiter-separated text line.

Further, the same type of monitoring data can be captured by different monitoring applications, and each from different perspectives. For example, both ITCAM for SOA log files and WPS CBE events can provide information on SCA (Service Component Architecture) invocations, but the tools format the invocation monitoring data differently with different details. Each CBE event emitted from a specific WPS server relates to a lifecycle state change of an SCA invocation that happened on that server. However, ITCAM for SOA generates SCA invocation monitoring data from both the caller and the callee perspectives. There are two log entries for each lifecycle state change of an SCA invocation: one for the caller, and the other for the callee. ITCAM for SOA also performs the monitoring with the goal of linking related SCA and Web Service invocations.

Moreover, the relationship determination process must be as non-intrusive as possible. The owner cannot rely on making source code changes to the managed applications and middleware for the needed relationship discovery and analysis data. The owner can only infer from the data provided by the deployed monitoring applications.

Conventional practices of realizing business-aligned management of shared IT infrastructures rely on ad hoc exploitation of the target system's component configuration files, application execution logs, and monitoring/metering data relationships. Conventional IT monitoring/metering products, such as, for example, BMC Patrol, HP OpenView and IBM Tivoli Monitor, can be used to gather detailed availability, performance, and utilization load data for each individual IT resource. Contemporary Business Service Management (BSM) products, such as, for example, CA eHealth, IBM Tivoli BSM and Proxima Centauri, support quality incident propagation through layered business system components via component dependency models. For example, a disk failure may impact the availability of a database application server which belongs to a particular line of business.

However, none of these products were developed to manage the dynamic execution dependency and resource consumption relationships between business process transaction instances and the underlying IT resources. It is also non-trivial to leverage those contemporary IT management products' capabilities in providing the desired visibility of instance-based dynamic utilization relationships between IT resources at layers of processes, applications, and servers.

U.S. Patent Application Publication US20060129419 proposes a method for progressively deriving the deployment configuration architecture of an IT system with the goal of minimizing the IT cost to value ratio for a given set of business functions. The method also provides an automatic means of coupling a component based model (CBM) of a business to components of an IT entity model, which uses the notion of "IT entity" to describe an IT system and environment. Besides IT entities, the base IT entity model comprises relationships among the IT entities and the interfaces and methods provided by these IT entities. The Publication teaches how to model, design, and analyze a "static" IT deployment architecture based upon cost to value ratio formulism and a component model of desired business functions. However, there is neither discussion about determining and analyzing "dynamic" utilization relationships between individual business process instances and IT infrastructure resources, nor the dynamic relationships between business and IT key performance indicators (KPIs). The Publication assumes the existence of a component-based model of business functions, a component-based model of IT assets, and the IT deployment alternatives between individual functional business components and sets of compositional IT assets. Timestamps are used to support the execution of an IT configuration derivation system before the IT system is deployed, but not to record the runtime behavior of deployed IT resources.

U.S. Patents Application Publications US20050119905, US20050125768, and US20050125449 disclose modeling of applications and business process services through auto discovery analysis, with static business process models (as proxies for real, executing business processes) interfaced to a common computing and management environment. However, the Publications do not include details on the information model used for modeling IT infrastructure components, business processes, and the dynamic utilization relationships between them. The information model covered in the Publications is similar to the object dependency models supported by contemporary BSM products such as, for example, CA eHealth, IBM TBSM, and Proxima Centauri. All of the models enable template-based grouping of IT infrastructure components and their KPIs into hierarchical "dependency topology" maps, each of which has a business function (or a business process solution identity) as its root. The maps are the basis for the business relevant IT management proposed in the Publications.

However, the Publications neither teach how to discover the dependency relationships between all of the IT infrastructure components (at layers of networked servers, applications, and process workflows) during the execution of a specific business process instance, nor the necessary information model for storing, analyzing, and exploiting those dynamic cross-layer utilization dependency data across all business process execution transactions.

U.S. Patent Application Publication US20050096949 proposes a mathematical model based adaptive approach to continuously manage the IT infrastructure configuration settings based upon business objectives. However, the publication neither teaches how to quantitatively validate the needed mathematical models using real measurement data in practice, nor how to effectively maintain the models for a changing IT infrastructure.

U.S. Pat. No. 6,976,090 proposes an Internet-based decentralized and differentiated content/application delivery solution, which enables content providers to directly control the delivery of content based upon regional and temporal preferences, client identity, and content priority. The patent teaches how decisions on content placement and replication can be controlled by a policy enactment scheme and how user requests to the contents can be routed to the most appropriate server based on the content providers' content delivery policies. However the publication does not teach how to discover, analyze, or exploit cross-layer utilization relationships between business transactions and IT infrastructure components.

Conventional methods have also been proposed to perform timestamp-base correlation between received messages and sent messages based on network-level traffic monitoring data. While these methods may discover network-protocol based relationships, they do not teach how to integrate the relationships with other inter-resource utilization relationships, such as those between business process level resources and application level resources, to discover the end-to-end business-IT utilization relationships.

Thus, there is a need for a system and method that can determine the resources generated by a service request by discovering dynamic utilization relationships between managed IT resources at the same or different IT layers using the data gathered by all of the deployed monitoring applications.

SUMMARY OF THE INVENTION

According to an exemplary embodiment of the present invention, a computer-implemented method for determining resources utilized by a service request in a data processing system is provided. The method includes determining monitored relationship types from monitoring data, determining relationship domains, wherein each of the domains is derived from one of the relationship types that is monitored by a single monitoring application, determining intra-domain relationships from relationships that are internal to the relationship domains, determining cross-domain relationships from the intra-domain relationships that are linked between pairs of the relationship domains, and determining resources utilized by the service request from the intra-domain and cross-domain relationships. The method may further include optimizing the data processing system using information about the resources utilized.

The monitoring data may be collected by a plurality of monitoring applications that monitor the data processing system. The monitoring data may be collected from data streamed in from each of the monitoring applications.

The intra-domain and cross-domain relationships may be between managed IT resources at a same or different IT layer. The intra-domain relationships may be determined by selecting an invocation relationship domain of the determined relationship domains, identifying callers and callees for the selected relationship domain from the monitoring data, determining invocation relationships between the callers and the callees, and determining causal relationships between the callees and the callers. The intra-domain relationships may additionally be determined by selecting a containment relationship domain of the determined relationship domains, identifying containers and containees for the selected relationship domain from the monitoring data, and determining containment relationships between the containers and the containees.

The resources utilized by the service request may be determined by deriving server identity information for each of the callers, callees, containers or containees from the monitoring data. CPU usage information may then be determined from servers that correspond to the determined server identity information.

The cross-domain relationships may be determined by selecting a pair of relationship domains of the determined relationship domains, identifying cross-callers and cross-callees among the selected pair of relationship domains from the monitoring data, and determining cross-causal relationships between the cross-callees and the cross-callers. Quasi-equal relationships may then be determined from the cross-causal relationships that correspond to the relationship domains that are based on a same one of the relationship types.

According to an exemplary embodiment of the present invention, a resource utilization determining system is provided. The resource utilization determining system includes a processor, a memory, and a resource utilization determining program. The resource utilization determining program includes a data receiving unit, a relationship determining unit, and a resource utilization determining unit. The processor executes the resource utilization determining program. The data receiving unit receives monitoring data from each of plurality of monitoring applications. The data receiving unit may include application data adapters to each receive a stream of the monitoring data. The relationship determining unit determines relationships from the monitoring data. The resource utilization determining unit determines resources utilized by a service request of a data processing system from the relationships. The resource utilization determining system may further include a network interface to communicate with the data processing system across a network.

The resource utilization determining program may further include an optimization unit to optimize the data processing system using information about the resources utilized by the service request.

The relationship determining unit may further include a relation domain determining unit, a basic relationship determining unit, and a derived relationship determining unit.

The relation domain determining unit may be used to determine relationship domains for each relationship type in the monitoring data that is monitored by one of the monitoring applications. The basic relationship determining unit may be used to determine intra-domain relationships of the relationship domain. The derived relationship determining unit may be used to determine cross-domain relationships between pairs of the relationship domains.

Units of the resource utilization determining system may communicate with each other using a publisher-subscriber model. The resource utilization determining system may further include a publishing unit which provides information about the resources utilized by the service request to a subscriber of the resource utilization determining system.

These and other exemplary embodiments, aspects, features and advantages of the present invention will be described or become more apparent from the following detailed description of exemplary embodiments, which is to be read in connection with the accompanying figures.

DETAILED DESCRIPTION OF EXEMPLARY EMBODIMENTS

In general, exemplary embodiments systems and methods for determining resources utilized by a service request in a data processing system will now be discussed in further detail with reference to illustrative embodiments of FIGS. 1-23.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
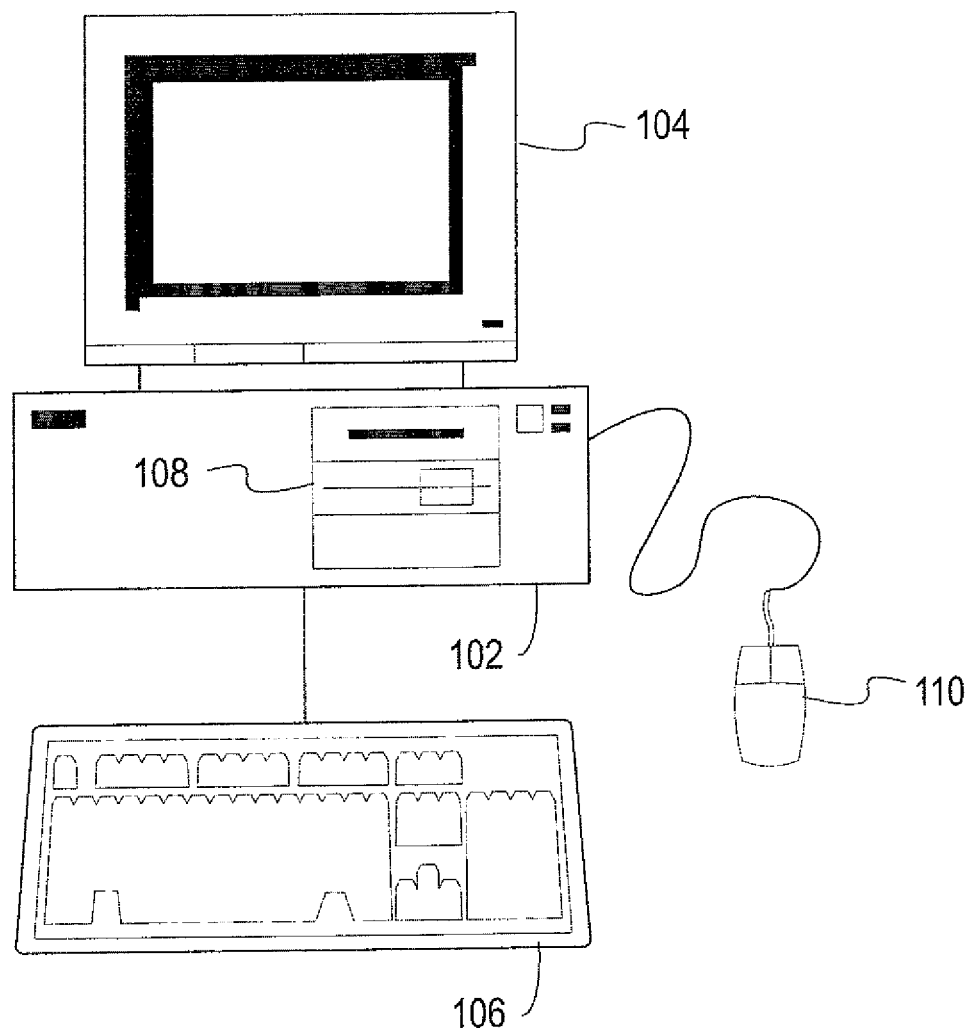
FIG. 1 is a pictorial representation of a data processing system which may be used implement an exemplary embodiment of the present invention.

FIG. 1 is a pictorial representation of a data processing system 100 which may be used to implement an exemplary embodiment of the present invention. Referring to FIG. 1, the data processing system 100 includes a computer 102, a video display terminal 104, a keyboard 106, storage devices 108, and a mouse 110. The storage devices 108, may include floppy drives and other types of permanent and removable storage media. Additional input devices may be included with the data processing system 100, such as, for example, a joystick, touchpad, touch screen, trackball, microphone, and the like. The data processing system 100 can be implemented using any suitable computer, such as, for example, an IBM eServer computer or IntelliStation computer. The data processing system 100 may include an interface (not shown) to connect to a network. The data processing system 100 preferably includes a graphical user interface (GUI) that may be implemented by means of systems software stored in a memory (not shown) of the computer 102 or residing in a computer readable media accessed by the computer 102.

Figure 2:
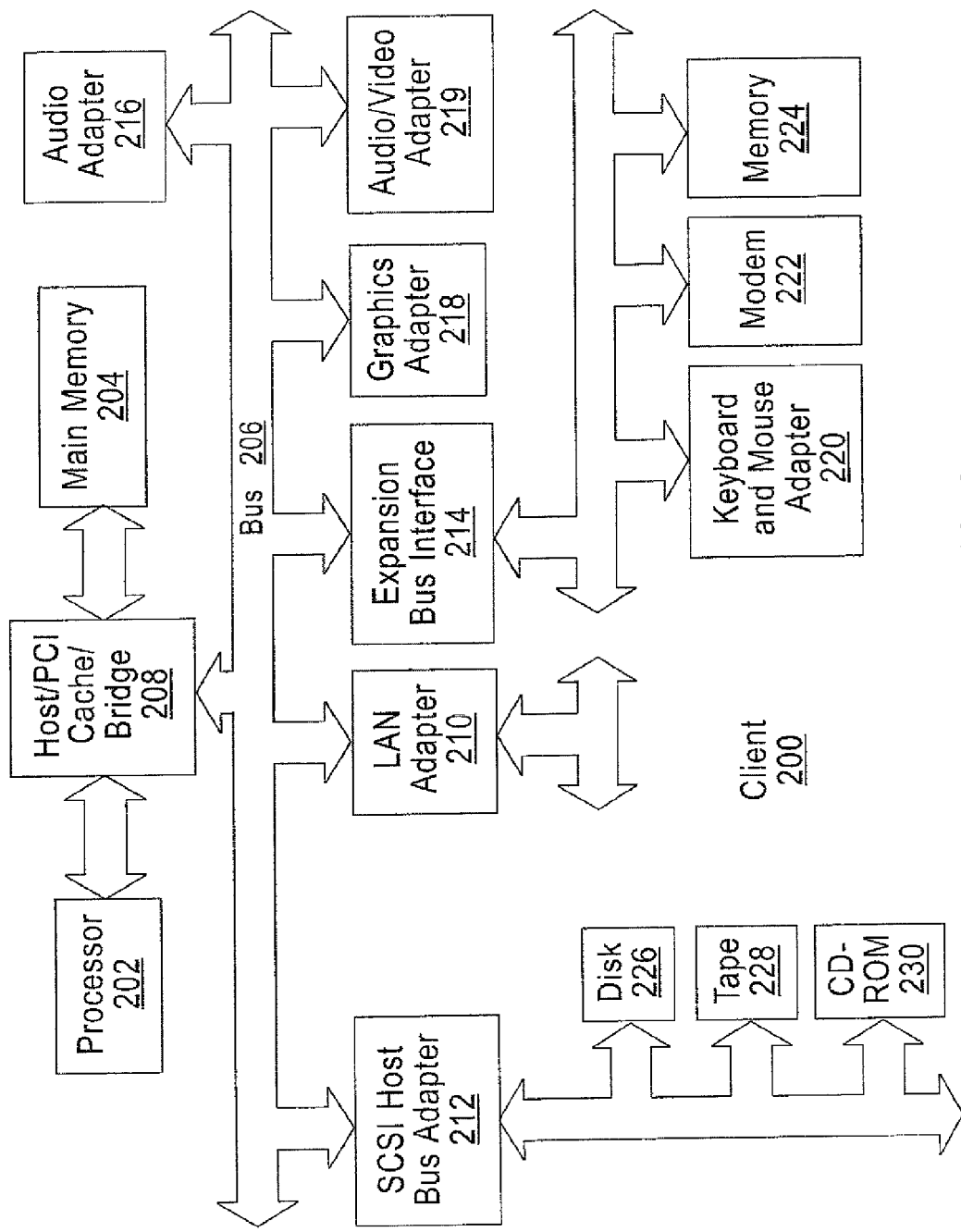
FIG. 2 is a block diagram of a data processing system which may be used to implement an exemplary embodiment of the present invention.

FIG. 2 is a block diagram of a data processing system 200 which may be used to implement an exemplary embodiment of the present invention. Referring to FIG. 2, the data processing system 200 includes a processor 202, a main memory 204, a PCI local bus 206, a PCI bridge 208, a local area network (LAN) adapter 210, a small computer system interface (SCSI) host bus adapter 212, an expansion bus interface 214, an audio adapter 216, a graphics adapter 218, an audio/video adapter 219, a keyboard and mouse adapter 220, a modem 222, additional memory 224, a hard disk drive 226, a tape drive 228, and a CD-ROM drive 230. Although the system depicted in FIG. 2 employs a peripheral component interconnect (PCI) local bus architecture, other bus architectures such as, for example, Accelerated Graphics Port (AGP) and Industry Standard Architecture (ISA) may be used. The processor 202 and main memory 204 are connected to the PCI local bus 206 through the PCI bridge 208. Although not illustrated in FIG. 2, the PCI bridge 208 may also include an integrated memory controller and cache memory. Additional connections to the PCI local bus 206 may be made through direct component interconnection or through add-in boards.

The local area network (LAN) adapter 210, small computer system interface SCSI host bus adapter 212, and expansion bus interface 214 may be connected to the PCI local bus 206 by direct component connection. The audio adapter 216, graphics adapter 218, and audio/video adapter 219 may be connected to the PCI local bus 206 by add-in boards inserted into expansion slots. The expansion bus interface 214 provides a connection for the keyboard and mouse adapter 220, the modem 222, and the additional memory 224. The SCSI host bus adapter 212 provides a connection for the hard disk drive 226, the tape drive 228, and the CD-ROM drive 230. Typical PCI local bus implementations may support three or four PCI expansion slots or add-in connectors.

An operating system runs on the processor 202 and is used to coordinate and provide control of various components within the data processing system 200. The operating system may be a commercially available operating system such as, for example Windows XP. An object-oriented programming system such as Java may run in conjunction with the operating system to provide calls to the operating system from Java programs or applications executing on the data processing system 200. Instructions for the operating system, the object-oriented programming system, and other applications or programs are located on storage devices, such as the hard disk drive 226, and may be loaded into main memory 204 for execution by the processor 202.

The hardware depicted in FIG. 2 may vary depending on the implementation. Other internal hardware or peripheral devices, such as flash read-only memory (ROM), equivalent nonvolatile memory, or optical disk drives and the like, may be used in addition to, or in place of, the hardware depicted in FIG. 2. The data processing system 200 may also include additional processors. For example, the data processing system 200, if optionally configured as a network computer, need not include the SCSI host bus adapter 212, hard disk drive 226, tape drive 228, or CD-ROM 230. The data processing system 200 would then include some type of network communication interface, such as the LAN adapter 210, the modem 222, or the like. As another example, the data processing system 200 may be a stand-alone system configured to be bootable without necessarily relying on a network communication interface. As a further example, the data processing system 200 may be a personal digital assistant (PDA), which is configured with ROM and/or flash ROM to provide non-volatile memory for storing operating system files and/or user-generated data.

The depicted example in FIG. 2 and the above-described examples are not meant to imply architectural limitations. For example, the data processing system 200 also may be a notebook computer or hand held computer other than a PDA. The data processing system 200 also may be a kiosk or a Web appliance. The processes of the present invention may be performed by the processor 202 using computer implemented instructions, which may be located in a memory such as, for example, the main memory 204, the additional memory 224, or in one or more peripheral devices 226-230.

Figure 3:
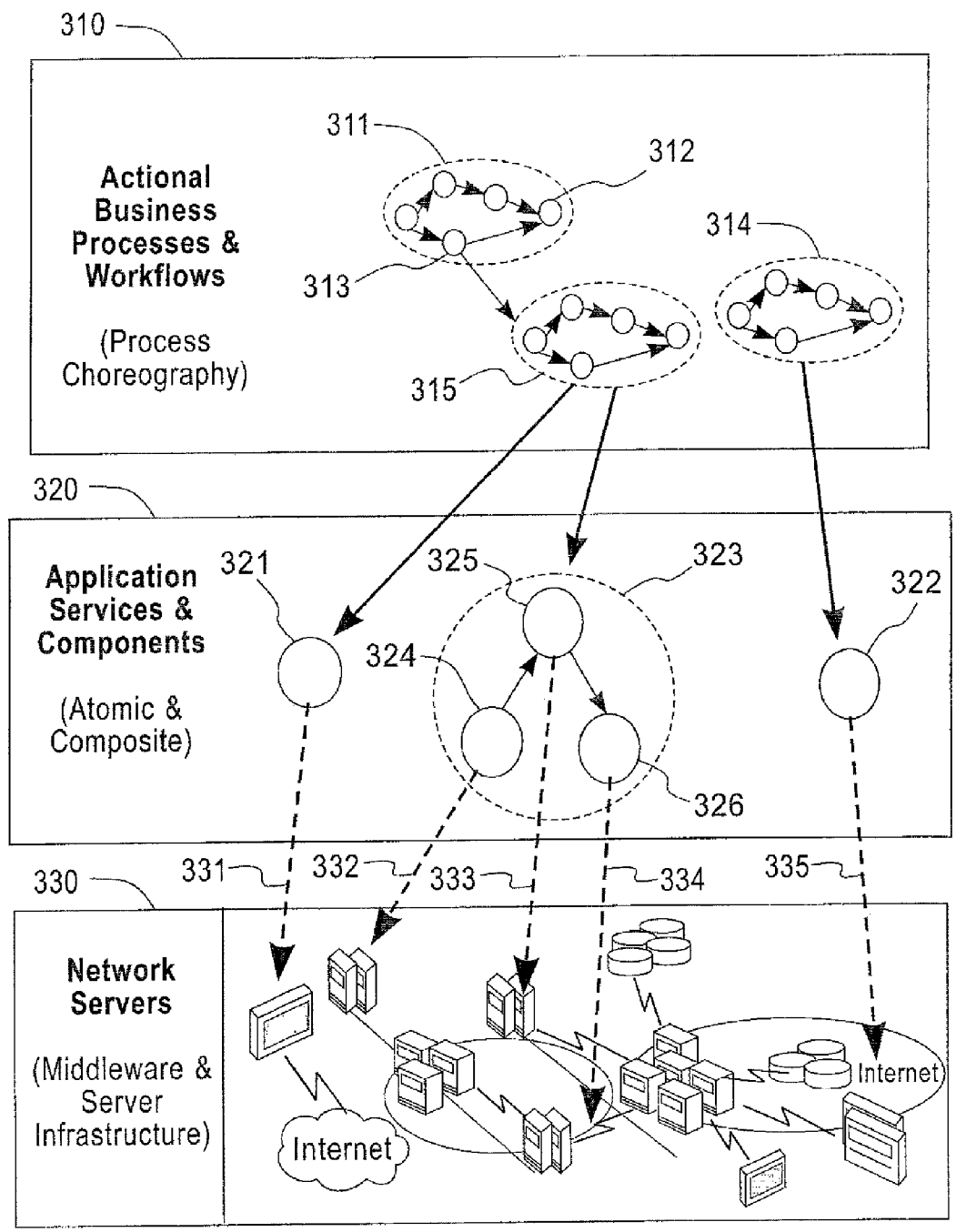
FIG. 3 illustrates exemplary layered components of a service oriented IT System which may be analyzed by an exemplary embodiment of the present invention, where IT services are provided via layers of object-oriented IT resources.

FIG. 3 illustrates exemplary layered components of a service oriented IT System which may be analyzed by an exemplary embodiment of the present invention, where IT services are provided via layers of object-oriented IT resources. Referring to FIG. 3, the service oriented IT system includes actional business processes and workflows 310, application services and components 320, and networked servers 330. At the business process layer 310, a process instance can contain a plurality of activity instances. For example, the process instance 311 contains activity instances 312 and 313. An activity instance can use or invoke another process instance. For example, the activity instance 312 uses process instance 314, and activity instance 313 uses process instance 315. The arrows shown in the process instances 311, 314, and 315 manifest the underlying process choreography models they use. FIG. 3 also illustrates that the implementation of the process instances 311, 314 and 315 use the IT services provided by the underlying application services and components 320. For example, process instance 314 uses application service component 322, and process instance 315 uses application service components 321 and 323. FIG. 3 depicts at the application layer 320, that the application service components 321 and 322 are atomic service components, and the application service component 323 is a composite service component. The application service component 323 is composed of atomic service components 324, 325, and 326. FIG. 3 illustrates utilization or invocation relationships between the atomic service components. For example, atomic service component 324 uses atomic service component 325, and atomic service component 325 uses atomic service component 326. FIG. 3 also illustrates that the application layer components are deployed atop middleware and server infrastructure 330, e.g., compute servers, storage servers, and network servers. Arrows 331, 332, 333, 334, and 335 exemplify the utilization or deployment relationships between the application layer components and the networked server layer resources. For example, 331 points to a presentation server, 332 to an application server on the Internet, 333 and 334 to two Web servers in a DMZ zone, and 335 to a transaction processing server in an Intranet.

Figure 4A:
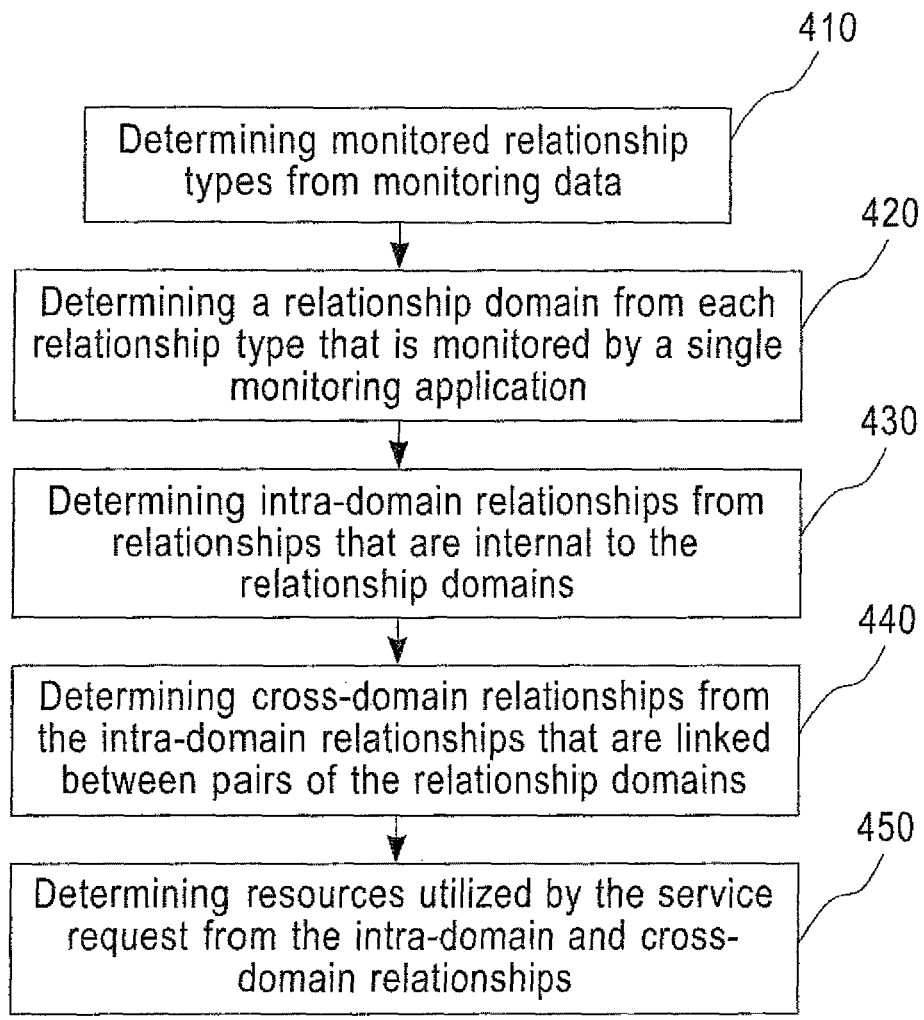
FIG. 4a is a high-level flow chart which illustrates a method for determining resources utilized by a service request in a data processing system according to an exemplary embodiment of the present invention.

FIG. 4a is high-level flow chart 400 which illustrates a method for determining resources utilized by a service request in a data processing system according to an exemplary embodiment of the present invention. In a managed environment, multiple monitoring applications may be present. The monitoring applications may include commercial products, customer-written programs, and application logs. Each monitoring application can provide monitoring data of multiple domains based on various different data types. For example, the applications may monitor different types of invocations, such as, for example, WS and SCA invocations. The types of data can be considered relationships. For example, an invocation relates to a caller and a callee, since the caller invokes the callee. Accordingly, the relationships may be divided into 2 categories: (1) intra-domain relationships, e.g. "invoke" and "contain" relationships within a single domain and (2) cross-domain relationships, e.g. "cause" relationships between domains. One monitoring application provides explicit correlation data to determine intra-domain relationships and cross-domain relationships within the application's monitoring data. For example, ITCAM for SOA produces log files, in which there are both parent correlators and current correlators that can assist basic invocation relationship discovery. However, cross-domain relationships between monitoring applications may not be explicit, and it can be difficult to identify such relationships. For example, WebSphere Server WPS Runtime and ITCAM for SOA are two different monitoring applications and cross-domain relationships between the two are implicit and require sophisticated analysis.

In the method 400, monitoring data is parsed for all the relationship types (410). For example, the relationship types may include different types of invocations and containment relationships. In a next step, a relationship domain is generated for each relationship type that is monitored by one of the monitoring applications (420). In a next step, intra-domain relationships that are internal to each of the corresponding domains are determined (430). For example, assume the ITCAM application monitors SCA invocations. The monitoring data that pertains to the SCA invocations monitored by the ITCAM application would be considered part of a first relationship domain. Each of the SCA invocations within the domain would be considered the intra-domain relationships. In a next step, cross-domain relationships are determined from the intra-domain relationships that relate to (i.e., link) pairs of the determined relationship domains (440). For example, assume that the ITCAM application also monitors WS invocations and a second relationship domain has been generated that includes those WS invocations. If a WS invocation from the second domain causes a SCA invocation in the first domain, there is a cross-domain relationship between the first and second domains. In a final step, resources utilized by a service request are determined from the intra-domain and cross-domain relationships (450). For example, assume there was a service request to book a flight. The intra-domain and cross-domain relationships that relate to the booking of that flight provides a map of the resources of the application data system that were utilized for that booking.

Figure 4B:
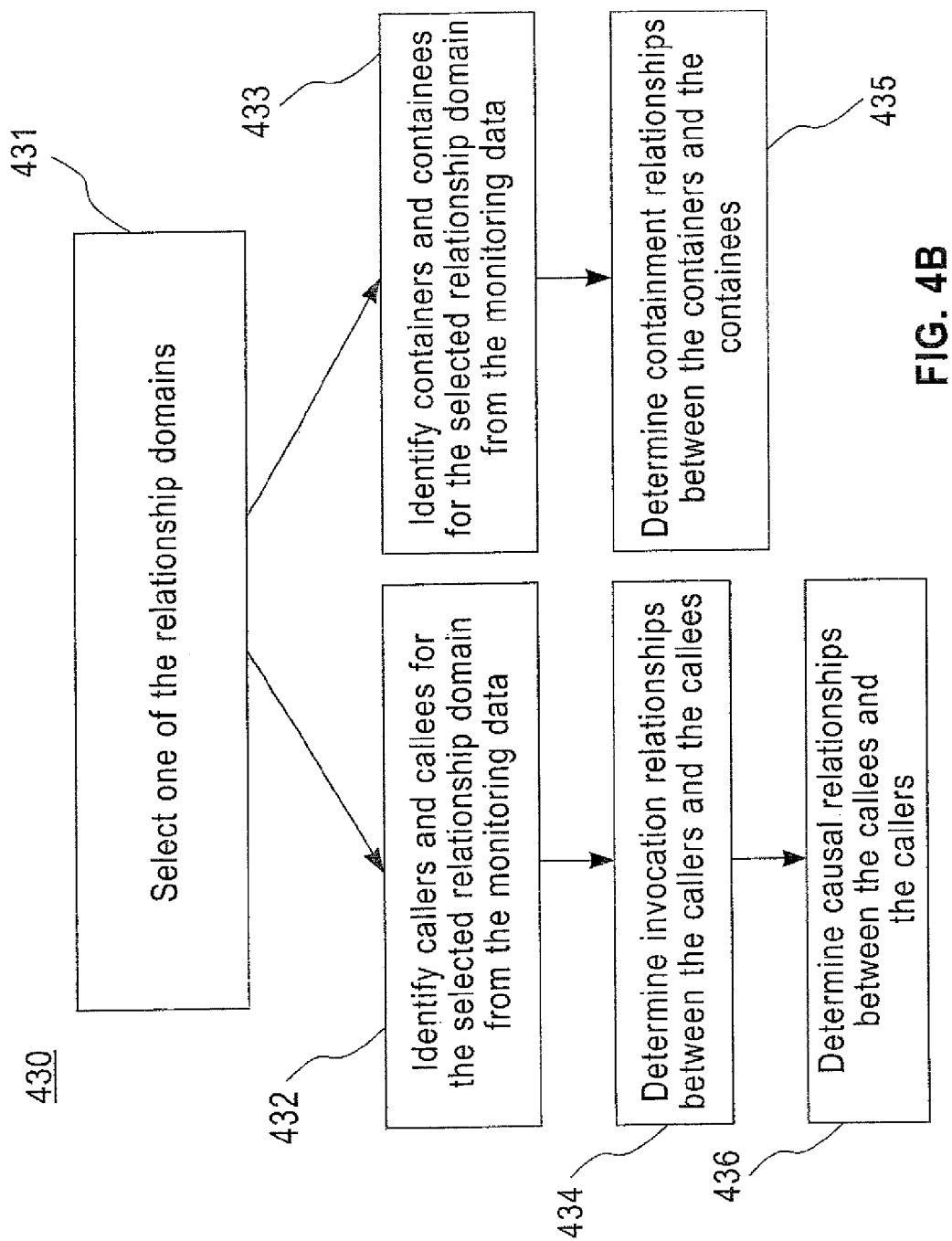
FIG. 4b is a high-level flow chart which illustrates a method of determining intra-domain relationships for the method of FIG. 4a, according to an exemplary embodiment of the present invention.

FIG. 4b is a high-level flow chart which illustrates a method of determining the intra-domain relationships for the method of FIG. 4a, according to an exemplary embodiment of the present invention. One of the previously determined relationship domains is first selected (431). The monitoring data for the selected domain is parsed to identify callers and callees (432) and/or containers and containees (433). Next, invocation relationships are determined between each of the callers and callees (434) and/or the containment relationships are determined between all the containers and containees (435). Causal relationships between the callees and the callers may then be determined (436). An example of an invocation relationship is a first object (caller) invoking a method of a second object (callee). An example of a containment relationship is a third object (container) containing a fourth object (containee). An example of a causal relationship is the invocation of the method of the second object causing the invocation of a method of a fifth object.

Figure 4C:
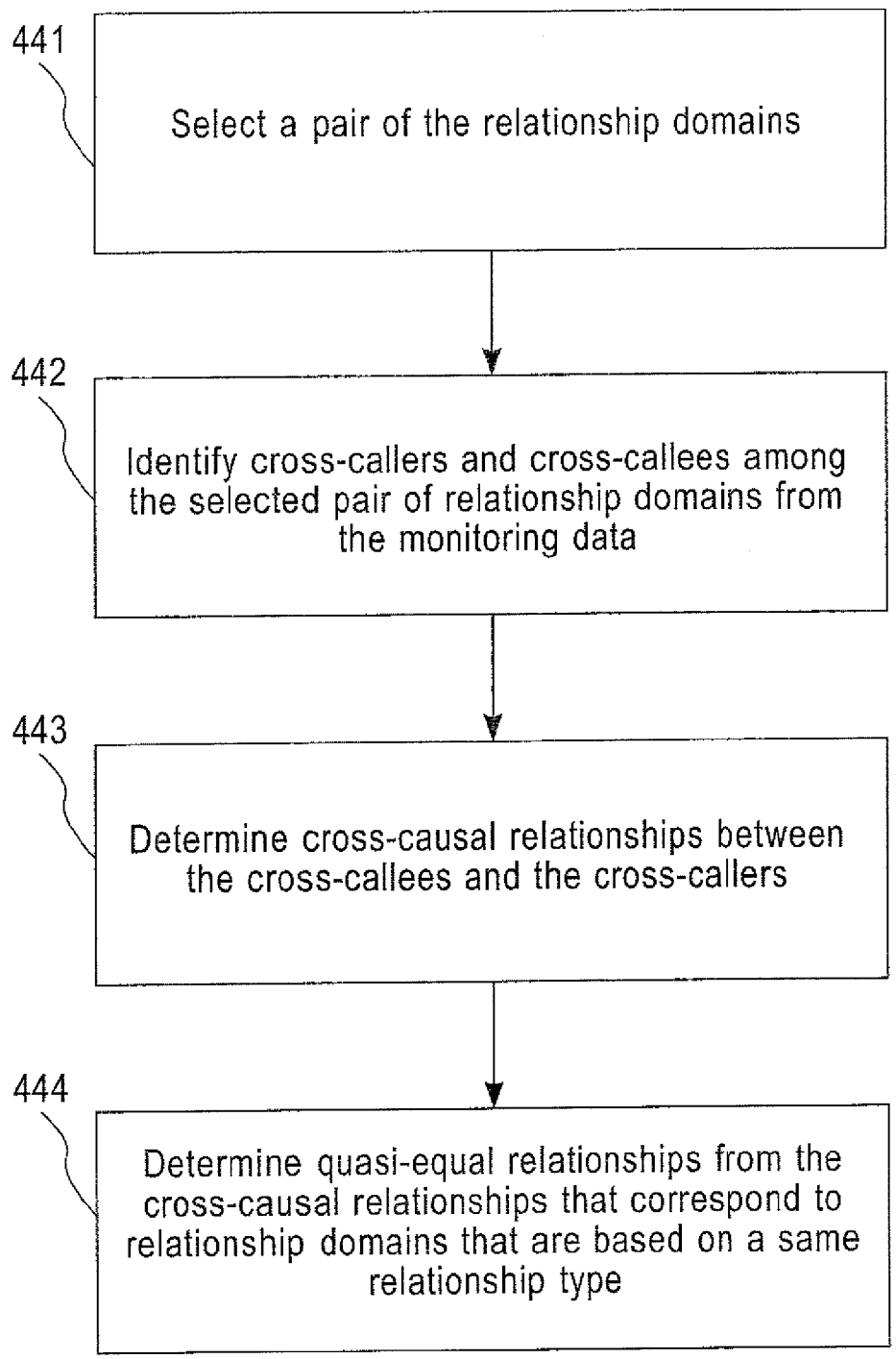
FIG. 4c is a high-level flow chart which illustrates a method of determining cross-domain relationships for the method of FIG. 4a, according to an exemplary embodiment of the present invention.

FIG. 4c is a high-level flow chart which illustrates a method of determining cross-domain relationships for the method of FIG. 4a, according to an exemplary embodiment of the present invention. A pair of the previously determined domains is first selected (441). Cross-callers and cross-callees among the selected pair of domains are then determined from the monitoring data of the pair of domains (442). Cross-causal relationships between the cross-callers and the cross-callers are then determined (443). For example, a first domain may include SCA invocations and a second domain may include WS invocations. An example of a cross-causal relationship is the invocation of a method of a first object (cross-caller) of the first domain causing the invocation of a method of a second object (cross-callee) of the second domain.

Quasi-equal relationships may then be determined from the cross-causal relationships that correspond to relationships domains that are based on a same relationship type (444). A quasi-equal relationship exists when two monitoring applications monitor the same relationship type. For example, two monitoring applications may both monitor SCA invocations, generating equivalent domains. The first object (cross-caller) may additionally be present in a third domain as observed by a second one of the two monitoring applications. The relationship monitored between the first object (cross-caller) in the first domain and the second object (cross-callee) of the second domain and the relationship between the first object (cross-caller) in the third domain and the second object (cross-callee) of the second domain are the same, and is considered a quasi-equal relationship. Knowledge of the quasi-equal relationships may be used to eliminate redundant information from a map of the end-to-end resources utilized by a service request.

Figure 4D:
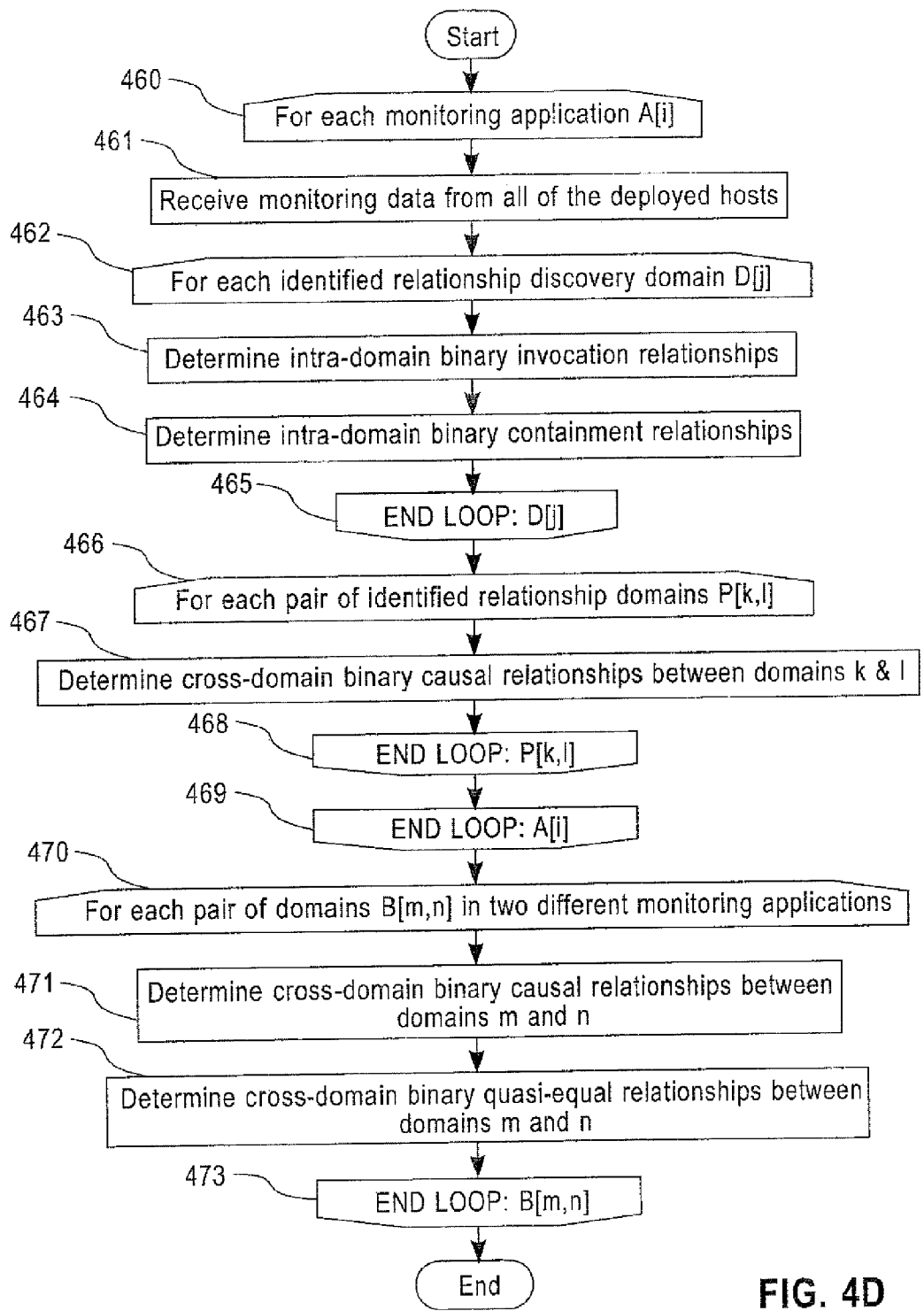
FIG. 4d illustrates a more detailed method for determining resources utilized by a service request in a data processing system according to an exemplary embodiment of the present invention.

FIG. 4d illustrates a more detailed method for determining resources utilized by a service request in a data processing system according to an exemplary embodiment of the present invention. First, all the relationships within the data for each monitoring application are determined. This is done by performing an iteration for each monitoring application (460). During each iteration, (1) monitoring data is received from all the deployed hosts (461), (2) for each identified relationship domain (462 and 465), intra-domain invocation relationships are determined (463), and intra-domain containment relationships are determined (464), (3) for each pair of identified relationship domains (466 and 468), cross-domain causal relationships are determined between them (467). The iterations end when all the monitoring applications are exhausted (469). Second, all the relationships between the monitoring applications are determined. This is done by performing an iteration for each pair of domains in two different monitoring applications (470). During each iteration, cross-domain causal relationships are determined between the two domains (471), and cross-domain quasi-equal relationships are determined between the two domains (472). The iterations end when all pairs of the domains are exhausted (473).

Figure 5:
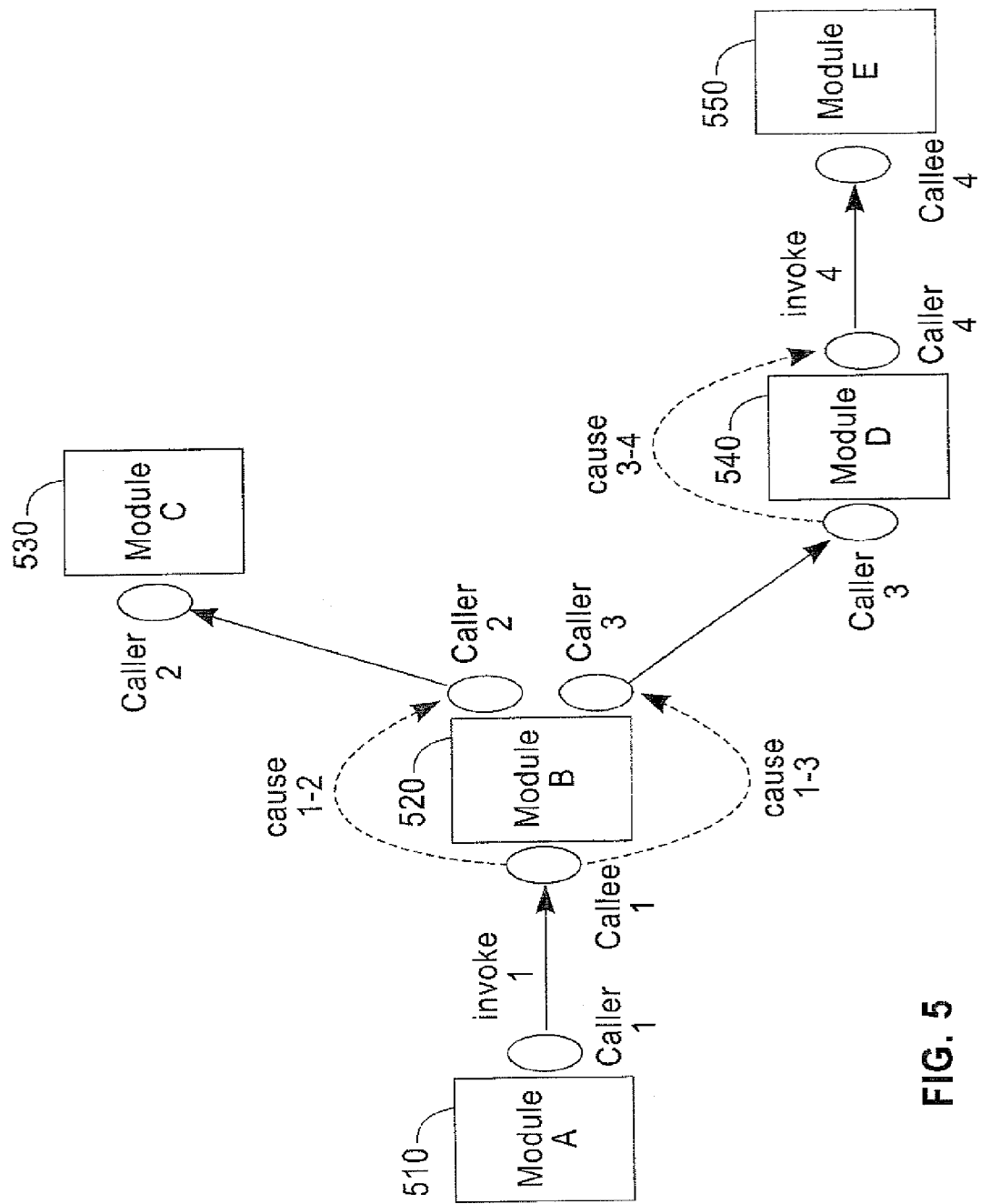
FIG. 5 is a block diagram modeling intra-domain invocation relationships.

FIG. 5 is a block diagram showing the model of "invoke" and "cause" relationships. Module A 510, Module B 520, Module C 530, Module D 540 and Module E 550 are true entities that participate in the invocation relationships. The first invocation is initiated by Module A to Module B as "invoke 1". When Module B receives the "invoke 1", it further generates two new child invocations, Module C as "invoke 2" and Module D as "invoke 3". When "invoke 3" arrives at Module D, Module D initiates another new child invocation "invoke 4" to Module E.

When the dynamic interaction is monitored at runtime, a monitoring tool observes only the invocations between Callers and Callees. Here, a Caller is a runtime reference to the true entity of the invocation initiator, while a Callee is a runtime reference to the true entity of the invocation receiver. For example, "Caller 1" is the runtime reference to Module A for "invoke 1". Although a Caller or a Callee holds certain attributes about its true entity, the monitoring tool can not determine its true identity without further information. From the point of view of the monitoring data, each Caller has an "invoke" relationship with one Callee, while the Callee of the parent "invoke" relationship may have multiple "cause" relationships with all the Callers of its child "invoke" relationships. For example, "Caller 1" has "invoke 1" relationship with "Callee 1" and has "cause 1-2" relationship with "Caller 2" and "cause 1-3" relationship with "Caller 3".

Figure 6:
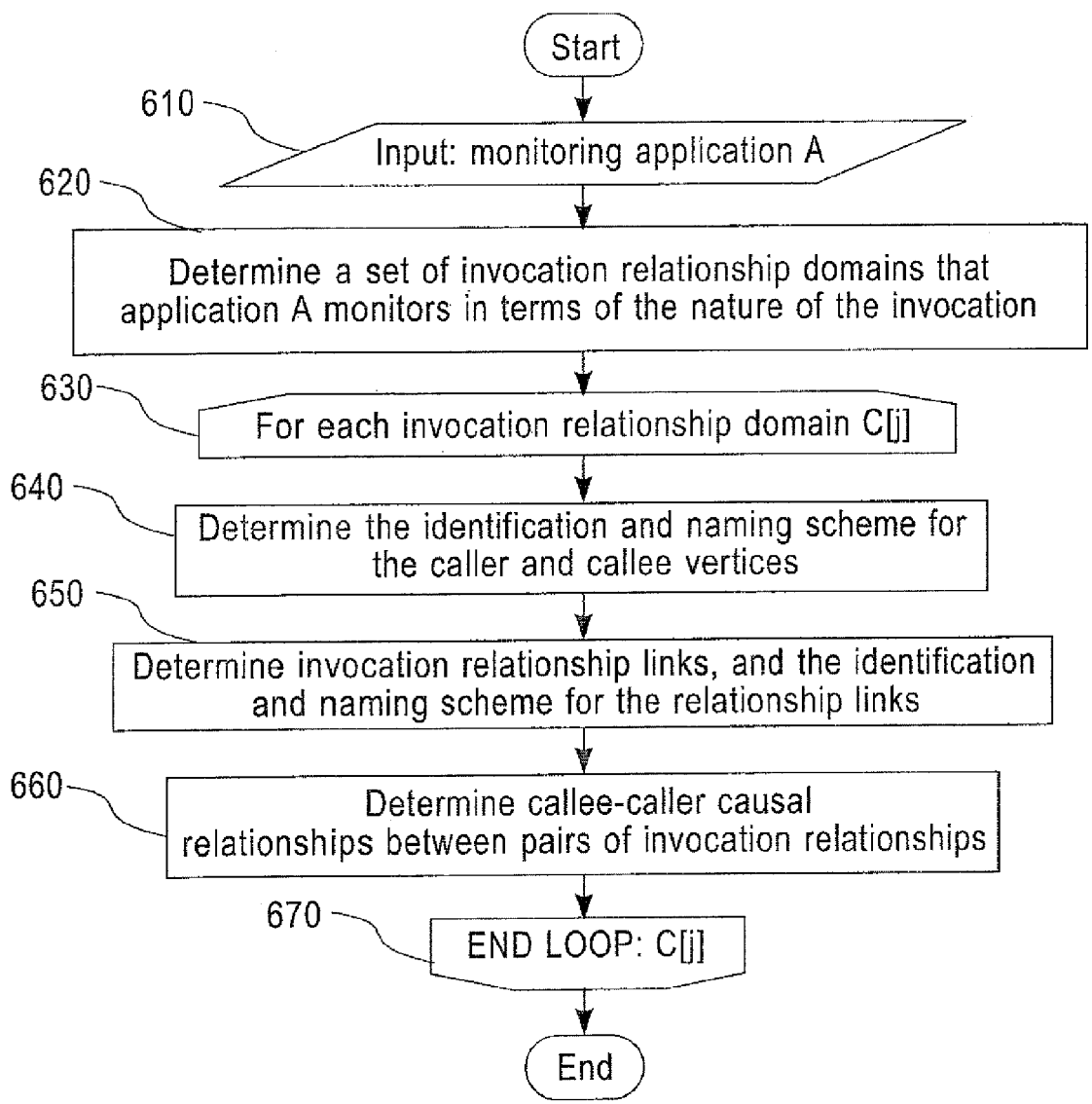
FIG. 6 illustrates a method for determining intra-domain invocation relationships according to an exemplary embodiment of the present invention.

FIG. 6 illustrates a method for determining intra-domain invocation relationships according to an exemplary embodiment of the present invention. Given one monitoring application A (610), a set of invocation relationship domains that application A monitors based on the nature of invocation is first determined (620). Then, iterations are performed for each invocation relationship domain (630). During each iteration, (1) the identification and naming scheme for both Caller and Callee vertices is determined (640), (2) invocation relationship links and the identification and naming scheme for the relationship links are determined (650), (3) Callee-Caller causal relationships between pairs of invocation relationships are determined (660), and the loop ends when all the invocation relationship domains have been exhausted (670).

Figure 7:
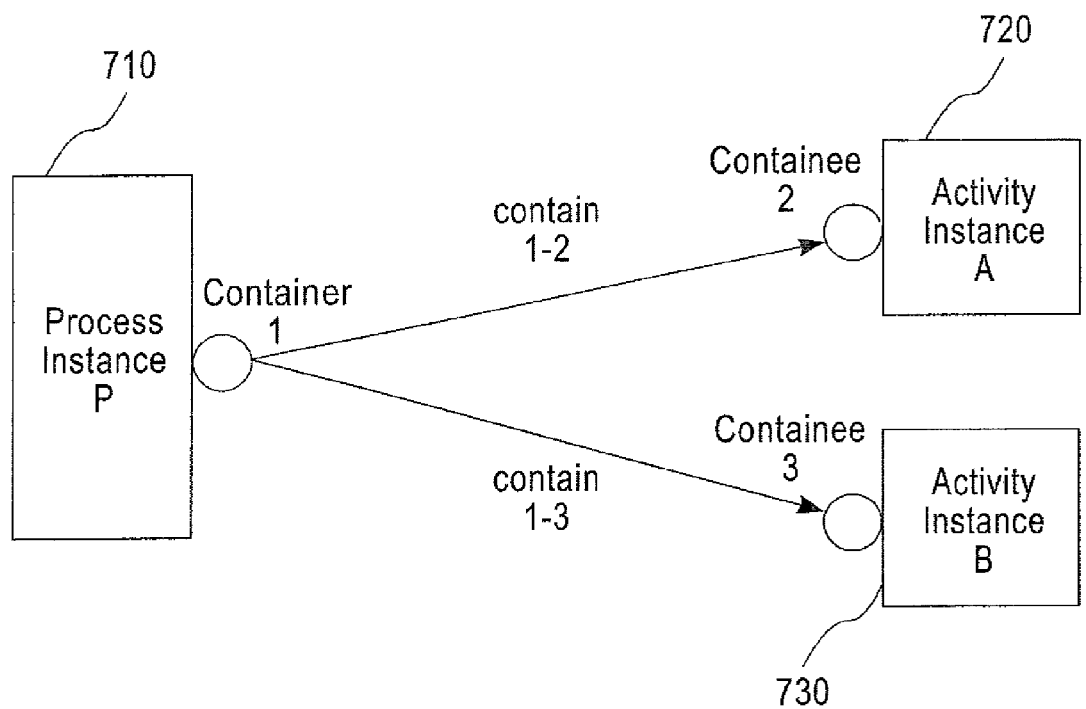
FIG. 7 is a block diagram modeling intra-domain containment relationships.

FIG. 7 is a graphical depiction of a containment relationship model. A basic contain relationship is a binary, asymmetrical relationship between that which contains (i.e., a Container) and that which is contained (i.e., a Containee). The contain relationship is stateless. One Container can contain many Containees, but a Containee can only be contained by one Container. The contain relationship models the observed instances of an "ownership" dependency relationship between two entities/objects. For example, in BPEL every Activity Instance 720 is "contained" by a Process Instance 710 and all the Activity Instances that are executed in response to a client request are contained by the same Process Instance. FIG. 7 shows that Process Instance P 710 was observed to contain two Activity Instances 720 and 730.

Figure 8:
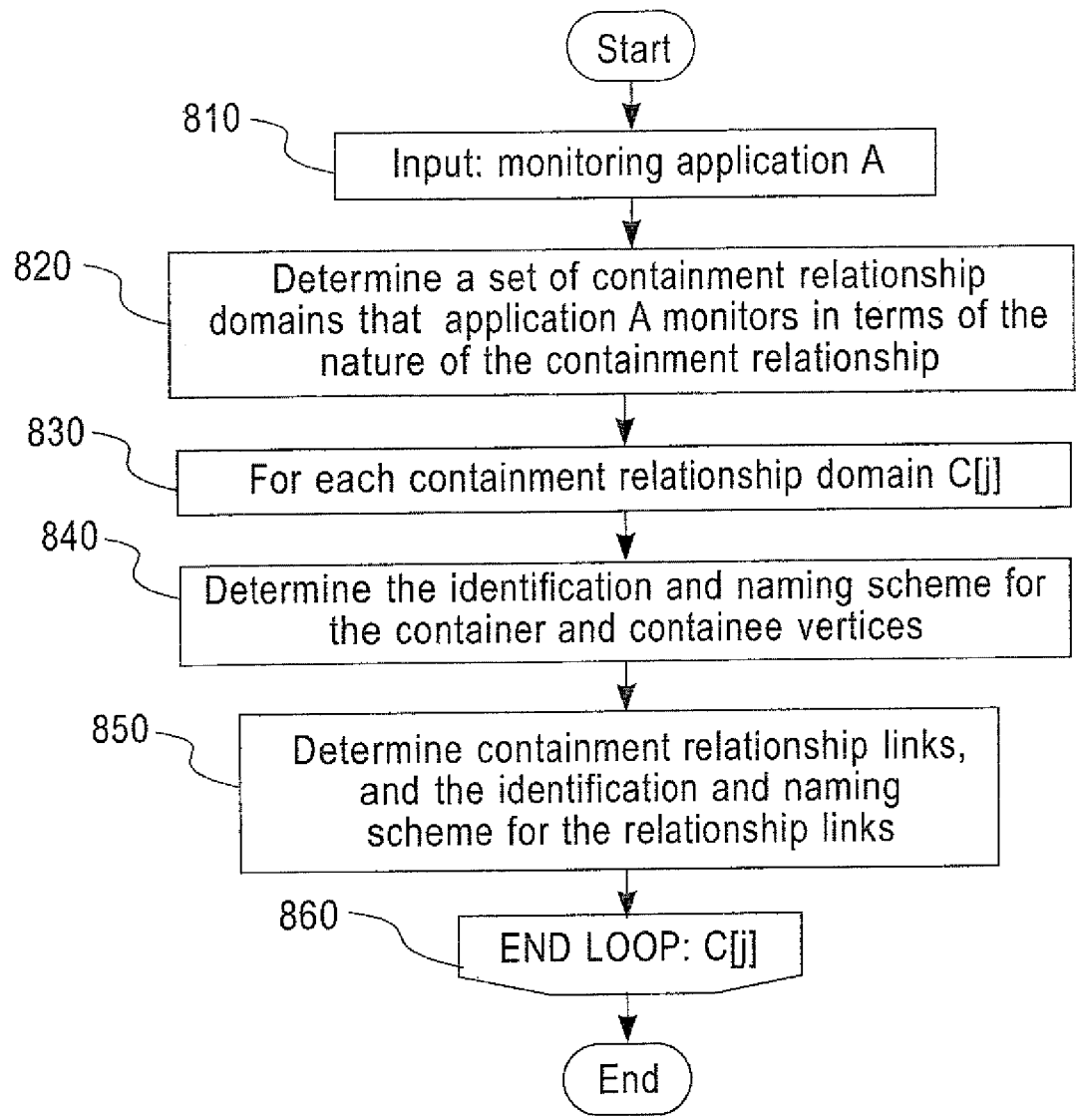
FIG. 8 illustrates a method for determining the intra-domain containment relationships according to an exemplary embodiment of the present invention.

FIG. 8 illustrates a method for determining intra-domain binary containment relationships according to an exemplary embodiment of the present invention. Given one monitoring application A (810), a set of containment relationship domains that application A monitors based on the nature of containment relationship is first determined (820). Then, iterations are performed for each containment relationship domain (830). During each iteration, (1) the identification and naming scheme for both Container and Containee vertices is determined (840), (2) containment relationship links and the identification and naming scheme for the relationship links are determined (850), and the loop ends when all the containment relationship discovery domains have been exhausted (860).

Figure 9:
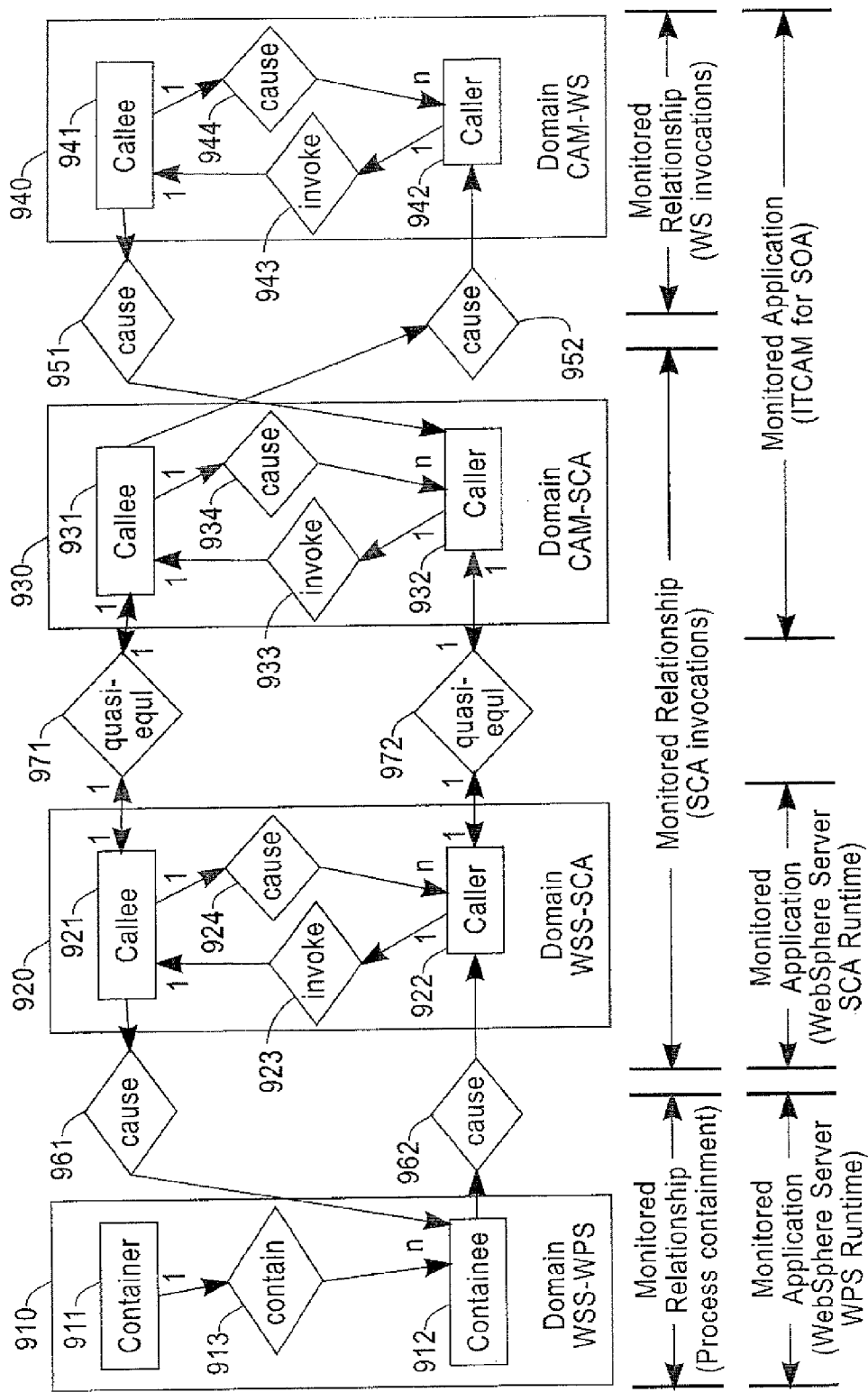
FIG. 9 is a block diagram depicting exemplary relationships determined by embodiments of the present invention.

FIG. 9 is a block diagram depicting exemplary relationships determined by embodiments of the present invention. There are three monitoring applications: WebSphere Server WPS Runtime, WebSphere Server SCA Runtime and ITCAM for SOA. The monitored relationship type of WebSphere Server WPS Runtime is process containment, the monitored relationship type of WebSphere Server SCA runtime is SCA invocations, and the monitored relationship types of ITCAM for SOA are SCA invocation and WS invocation. Domain WSS-WPS 910 is the relationship domain for process containment relationship monitored by the WebSphere Server WPS Runtime. The Domain WSS-WPS (910) includes entities: Container 911 and Containee 912. The Container 911 can contain multiple Containees. The Domain WSS-SCA 920 is the relationship domain for SCA invocation relationships monitored by WebSphere Server SCA Runtime. The Domain WSS-SCA 920 includes entities: Caller 922 and Callee 921. The Caller 922 invokes the one Callee 921, while the one Callee 921 can cause multiple Callers. The Domain CAM-SCA 930 is the relationship domain for SCA invocation relationships monitored by ITCAM for SOA. The Domain CAM-SCA 930 includes entities: Caller 932 and Callee 931. The one Caller 932 invokes the one Callee 931, while the one Callee 931 can cause multiple Callers. The Domain CAM-WS 940 is the relationship domain for WS invocation relationship monitored by ITCAM for SOA. The Domain CAM-WS 940 includes entities: Caller 942 and Callee 941. The one Caller 942 invokes the one Callee 941, while the one Callee 941 can cause multiple Callers.

Inter-domain or cross-relationships are present between the Domain CAM-WS 940 and the Domain CAM-SCA 930. The Callee 941 in the Domain CAM-WS 940 can cause 951 the Caller 932 in the Domain CAM-SCA 930, and the Callee 931 in the Domain CAM-SCA 930 can cause 952 the Caller 942 in the Domain CAM-WS 940. Cross-domain relationships are also present between the Domain WSS-WPS 910 and the Domain WSS-SCA 920. The Callee 921 in the Domain WSS-SCA 920 can cause 961 Containee 912 in the Domain WSS-WPS 910, and the Containee 912 in the Domain WSS-WPS 910 can cause 962 Caller 922 in the Domain WSS-SCA 920. While the Domain CAM-SCA 930 belongs to the SOA monitoring application and the Domain WSS-SCA 920 belongs to WebSphere Server SCA Runtime, the two relationship domains are basically identical from the point of view of two different monitoring applications. Accordingly, "quasi-equal" relationships 971 and 972 are present between the two domains 920 and 930.

Figure 10:
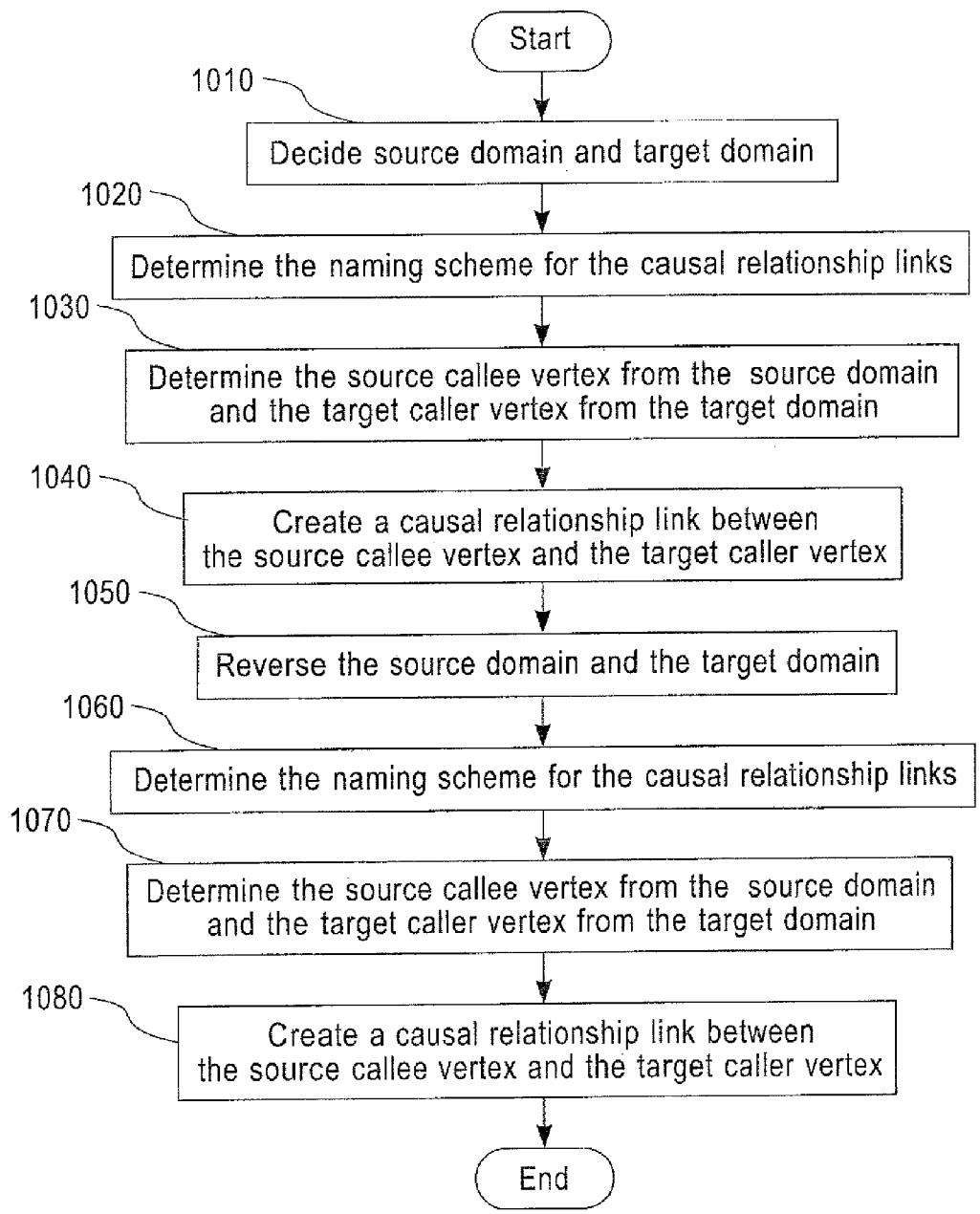
FIG. 10 illustrates a method for determining cross-domain causal relationships that are between two invocation relationship domains and are based on the same monitoring application, according to an exemplary embodiment of the present invention.

FIG. 10 depicts a method for determining cross-domain causal relationships that are between two invocation relationship domains based on the same monitoring application, according to an exemplary embodiment of the present invention. Given two invocation relationship domains that are based on the same monitoring application, one domain is chosen as the source domain and the other as the target domain (1010), (1) the naming scheme for the causal relationship links is determined (1020), (2) the source Callee vertex is determined from the source domain and the target Caller vertex is determined from the target domain (1030) and a causal relationship link is generated between the source vertex and the target vertex (1040). The source domain and the target domain are then reversed (1050). Then (1) the naming scheme for the causal relationship links is determined (1060), (2) the source Callee vertex is determined from the source domain and the target Caller vertex is determined from the target domain (1070), and a causal relationship link is generated between the source vertex and the target vertex (1080).

Figure 11:
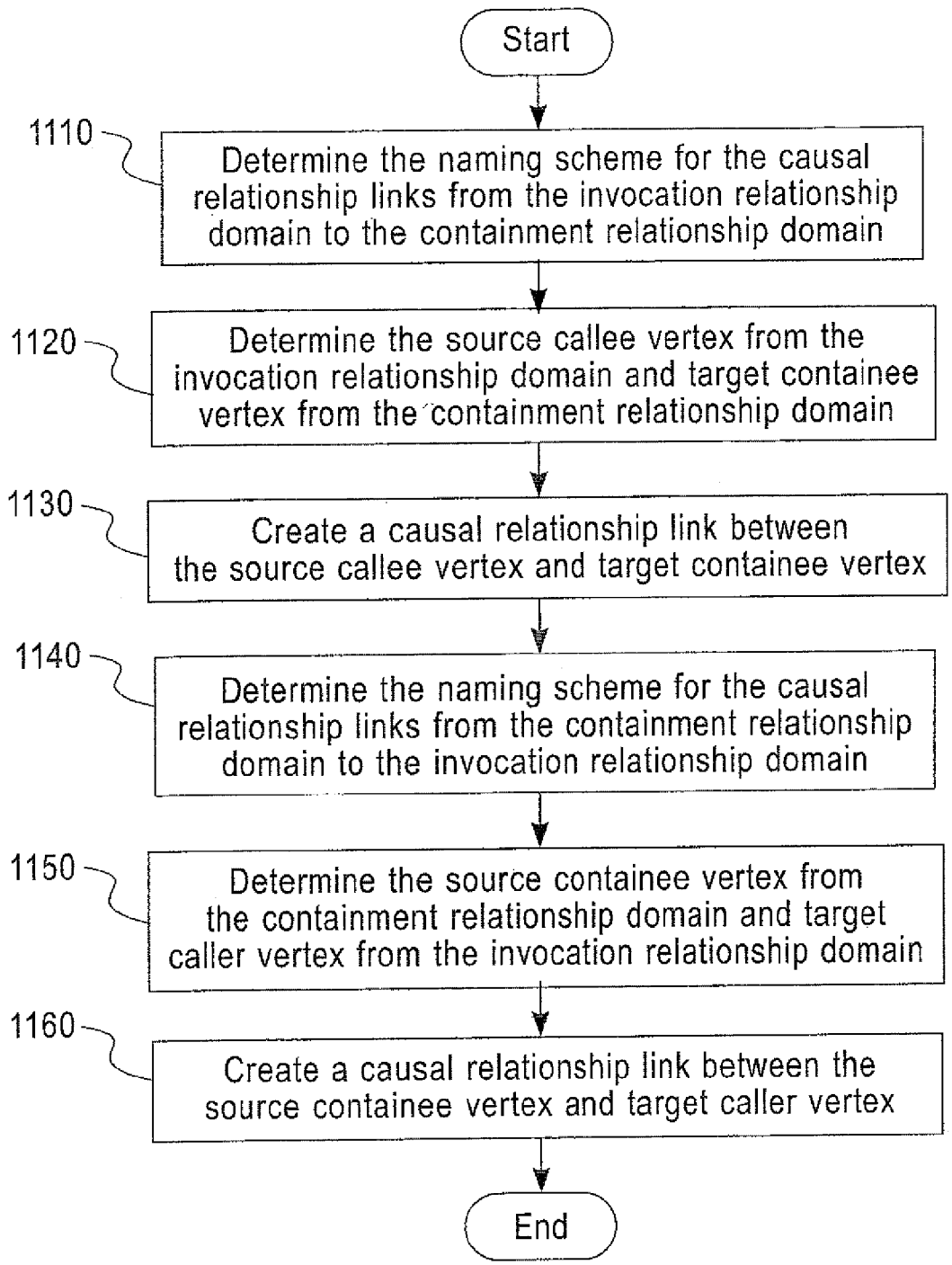
FIG. 11 illustrates a method for determining cross-domain causal relationships that are between a containment relationship domain and an invocation relationship domain from different monitoring applications, according to an exemplary embodiment of the present invention.

FIG. 11 illustrates a method for determining cross-domain causal relationships that are between a containment relationship domain and an invocation relationship domain from different monitoring applications, according to an exemplary embodiment of the present invention. Given one containment relationship domain and one invocation relationship domain based on different monitoring applications, the naming scheme for the causal relationship links from the invocation relationship domain to the containment relationship domain is determined (1110), and source Callee vertex is determined from the invocation relationship domain and the target Containee vertex is determined from the containment relationship domain (1120). When a causal relationship is found, a causal relationship link is determined between the source Callee vertex and the target Containee vertex (1130). Likewise, the naming scheme for the causal relationship links from the containment relationship domain to the invocation relationship domain is determined (1140), and the source Containee vertex is determined from the containment relationship domain and the target Caller vertex is determined from the invocation relationship domain (1150). A causal relationship link is generated between the source Containee vertex and the target Caller vertex when such a relationship is found (1160).

Figure 12:
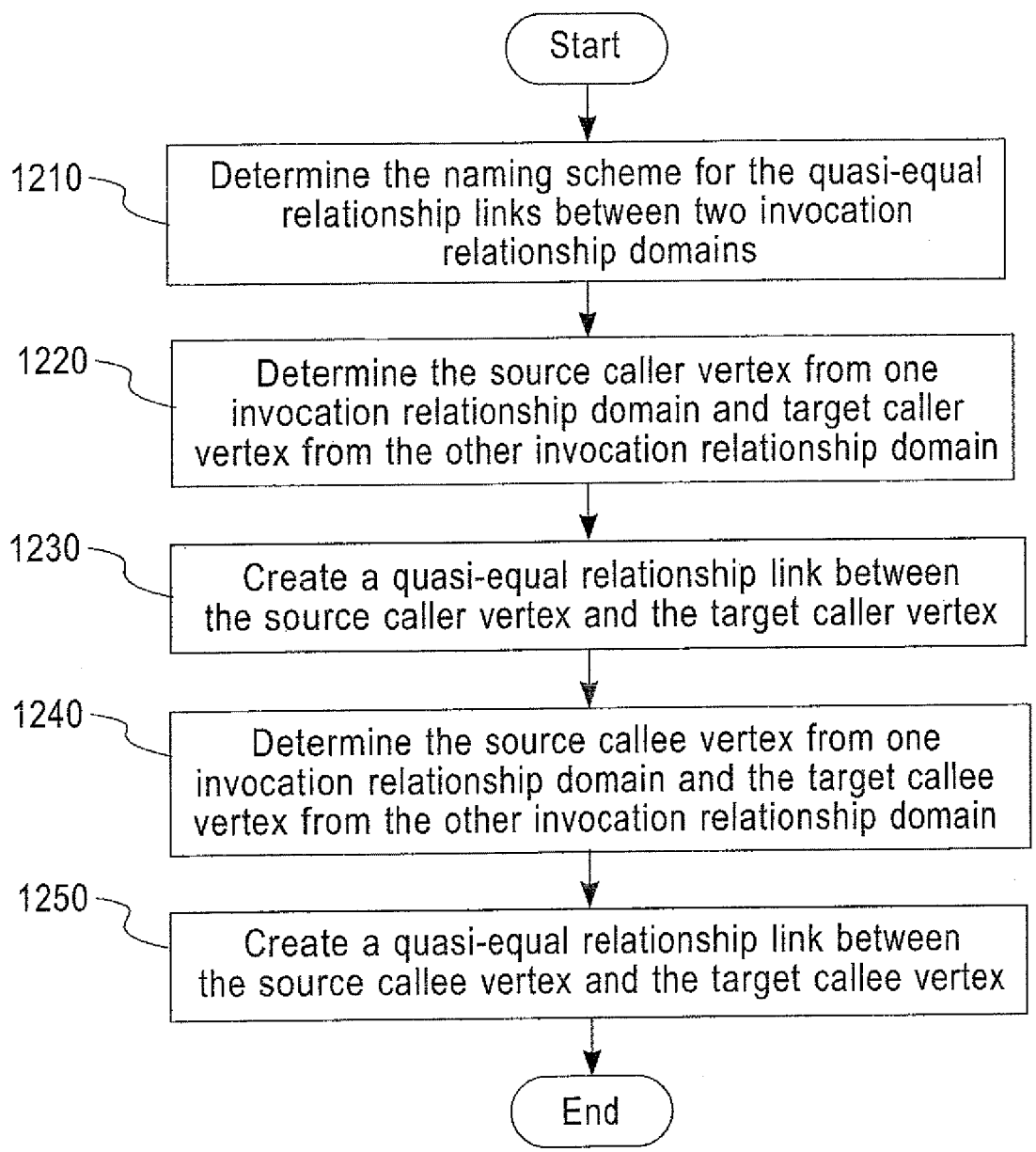
FIG. 12 illustrates a method for determining cross-domain "quasi-equal" relationships that are between two invocation relationship domains from different monitoring applications, according to an exemplary embodiment of the present invention.

FIG. 12 illustrates a method for determining cross-domain "quasi-equal" relationships that are between two invocation relationship domains from different monitoring applications, according to an exemplary embodiment of the present invention. Given two invocation relationship domains based on different monitoring applications, the naming scheme for the quasi-equal relationship links are determined between them (1210), and the source Caller vertex is determined from one invocation relationship domain and the target Caller vertex is determined from the other invocation relationship domain (1220). When a "quasi-equal" relationship is found, one "quasi-equal" relationship link is generated between the source Caller vertex and the target Caller vertex (1230). Furthermore, the source Callee vertex is determined from one invocation relationship domain and the target Callee vertex is determined from the other invocation relationship domain (1240). Likewise, a "quasi-equal" relationship link is generated between the source Callee vertex and the target Callee vertex when such a relationship is found (1250).

Figure 13:
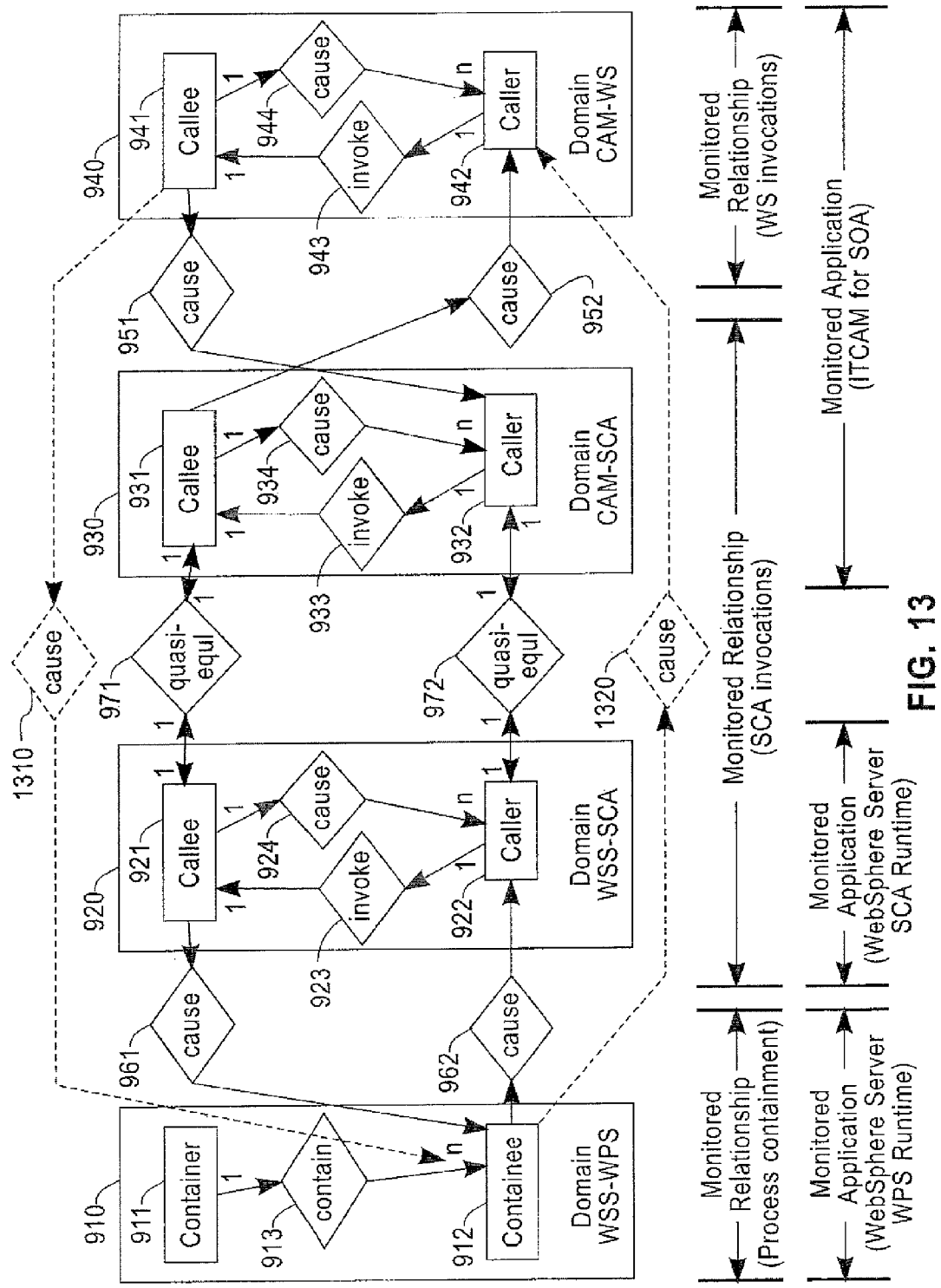
FIG. 13 is a block diagram depicting exemplary derived relationships based on basic invoke and cause relationships.

FIG. 13 illustrates two derived cause relationships 1310 and 1320 based on other basic and derived relationships. A basic invoke relationship indicates that the Caller entity caused the Callee entity to execute. When a basic cause relationship is observed, the source entity "caused" execution of the target entity. Moreover, a basic cause relationship can trigger an invoke relationship, and the invoke relationship, in turn, can trigger one or more cause relationships. These two relationship types are called direct causal relationships. Thus, any direct causal relationship can trigger a tree of cascading causal relationships. Causal relationships can also propagate through quasi-equal relationships. Causal and quasi-equal relationships are considered closed under transitivity.

FIG. 13 also illustrates two derived relationships 1310 and 1320, each of which is a new relationship determined from other relationships. One of the derived relationships is a derived cause 1310 relationship from the Callee vertex in the Domain CAM-WS 941 to the Containee vertex in the Domain WSS-WPS 911 and the other is a derived cause 1320 relationship from the Containee vertex in the Domain WSS-WPS 912 to the Caller vertex in the Domain CAM-WS 942. Both derived cause relationships 1310 and 1320 can be determined based on graph traversal over the basic invoke and basic intra-domain and cross-domain relationships under transitive closure. A derived relationship can also be discovered from other derived relationships. For example, if the Domain WSS-SCA 920 and the Domain CAM-SCA 930 are not present, the two derived cause relationships 1310 and 1320 can still be determined as cross-domain relationships between the Domain CAM-WS 910 and the Domain WSS-WPS 940. However, the quality of the derived cause relationships 1310 and 1320 determined in such a manner may not be better because availability of more data can only improve quality.

Figure 14:
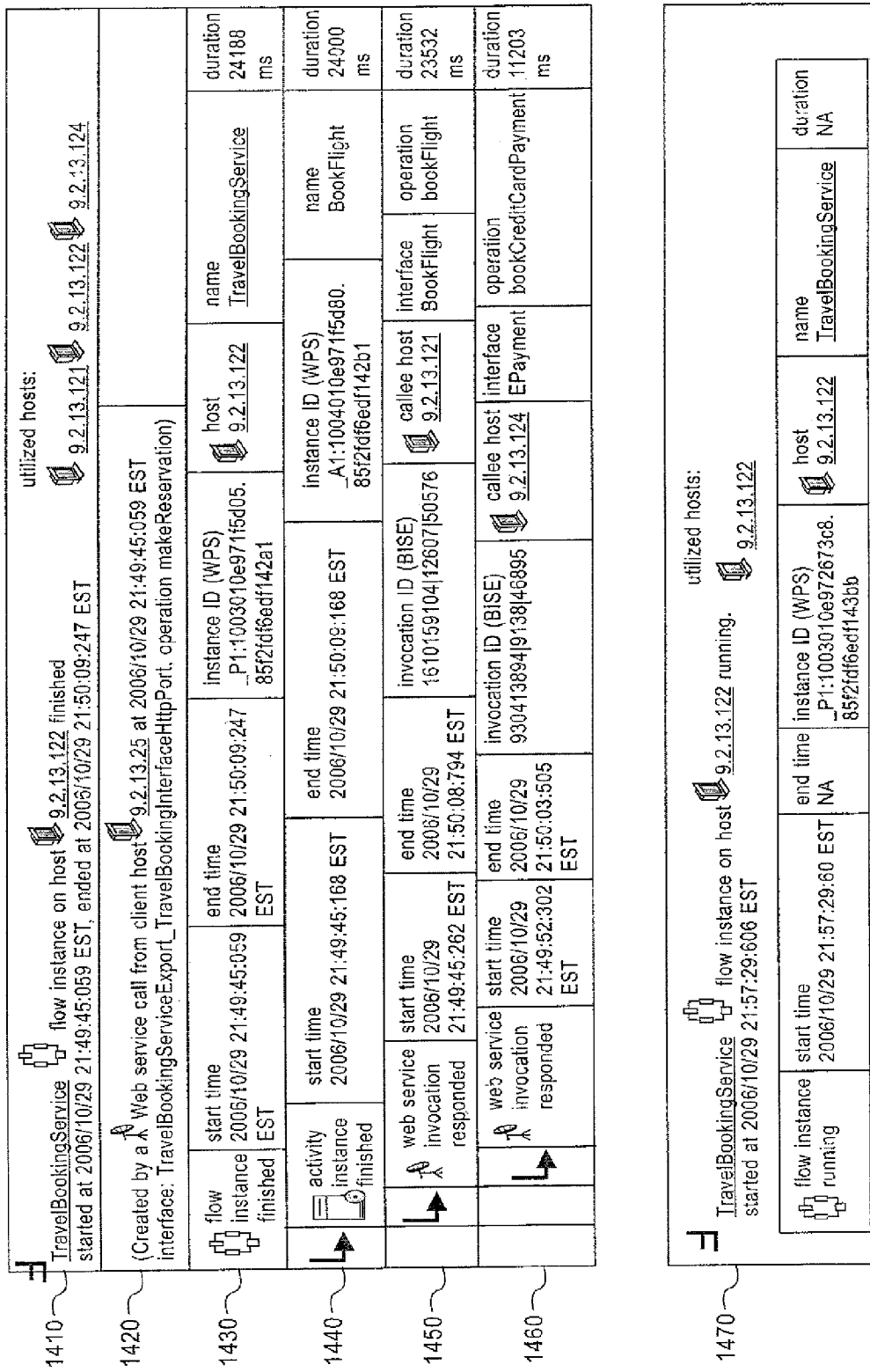
FIG. 14 is a sample screenshot from a Web-based real-time display application that provides an end-to-end view of determined causal and resource utilization relationships in a managed SOA application environment.

FIG. 14 is a sample screenshot from a Web-based real-time display application that provides an end-to-end view of determined causal and resource utilization relationships in a managed SOA application environment. The display application relates all incoming client Web service invocations to the flow (e.g. BPEL process) instances, activity (e.g. BPEL activity) instances, Web service invocations caused by the client requests, and all the servers utilized in service of the request. There is one entry for each client request that caused a flow instance. All discovered flow instances are displayed in a descending order by the timestamp of when the client Web service invocation was received. For each flow instance, a line is displayed containing the flow type (e.g. BPEL process template name), the current state, start time, end time, and a list of IP addresses of servers that were utilized to complete the execution of the necessary tasks.

The first line of information 1410 includes a summary of a flow instance that was triggered by a service request. The first line of information 1410 includes the flow instance name, the server it started on, its start and end time, and a list of the servers the flow instance utilized. The second line of information 1420 includes information about the originating external client request that triggered the chain of activities. The second line of information 1420 includes the client hostname, the time of the invocation, the Web Service interface and operation names. A more detailed table of information is provided below the second line of information 1420. The first entry of the table includes information about the flow instance 1430 and includes the flow instance current state, start time, end time, its instance ID, the server on which the flow instance is executed, the flow type, and the total duration. The table also displays the activity instances in the order they are started. For each activity instance 1440, the current execution state, start time, end time, its ID, the server on which it executed, the activity name, and the duration are shown. If the activity instance 1440 caused a tree of Web service invocations 1450 and 1460, they are also displayed under the activity instance 1440. For each Web service invocation 1450 and 1460, the current invocation state, start time, end time, the unique ID, the server on which the web service was executed, the interface, operation, and the duration are shown. The Web service display entries are indented hierarchically to illustrate the call levels. As illustrated in FIG. 14, the first flow instance finished, and it involved one activity instance 1440 which caused one Web service invocation 1450, which, in turn, caused another Web service invocation 1460. The second entry is a running flow instance 1470 which is a snapshot of the current resources being utilized by the flow instance.

An imputed causal relationship is a derived causal relationship which can be determined from other relationships. The derivation of an imputed causal relationship from a cross-domain cause and a contain relationship will be described with reference to FIG. 9. In the WSS-WPS Domain, the Container and the Containee are related by the contain relationship, and the Containee can be a target of a cross-domain cause relationship from the WSS-SCA Domain. The WSS-WPS Domain is a model that can reflect the BPEL-based business processes and activities in an SOA environment, such as the containment relationships between BPEL process instances and activity instances. A cross-domain cause relationship between a Callee in the WSS-SCA Domain and a Containee can represent an SCA invocation that caused a BPEL "Receive" (or "Pick") activity instance to be activated. A BPEL process instance is also created to contain the activity instance. Alternately, when an SCA invocation is made by a business process activity instance, a cause relationship can be determined between the activity instance and a Caller in the WSS-SCA Domain. For example, such a cause relationship is present when an instance of the BPEL "Invoke" activity makes an SCA call to initiate a remote Web service call. Typically in such an environment, a client request is received via a Web service call. In response, a business process instance is created, and a set of activity instances, starting with a "Receive", are created and executed to fulfill the client request. The types of activities and the order in which the instances are executed are determined by the rules defined in a "process template." BPEL activities can also be run in parallel. The activity instances that are executed in response to the request are related by the containment relationship to the associated process instance. It can be deduced that all the related activity instances in the same process instance are caused by the same incoming cause relationship. This is an example of imputed causal relationships.

Imputation implies that if vertex V1 is related to vertex V2 by relationship type R1, and V2 is related to vertex V3 by relationship type R2, then all vertices that are related to V3 by R2 are also related to V1 by R1. A BPEL process instance, however, can be the target of multiple cross-domain cause relationships from the WSS-SCA to the WSS-WPS Domains. This is because a BPEL process instance can contain more than one "Receive" or "Pick" activity instances. It can then be deduced that all the activity instances that are started after a "Receive" activity instance has finished are causally related to one another. This means that some activity instances will be causally related to more than one incoming cross-domain cause relationships, if multiple "Receive" or "Pick" activity instances are present in the same process instance.

A process instance may also contain parallel activity execution branches. When a cross-domain causal relationship occurs on an activity instance on one branch, all activity instances that start after the causal relationship took place will be considered causally related to the incoming causal relationship even if they are on different branches. This is because the monitoring data from the monitoring application on which the containment relationship model is based, can only be used to determine that a set of activity instances executed and when that execution occurred. Even though the causal relationship on one branch did not directly cause the execution of the later activity instances on other parallel branches, this is said to be a "weak" causal relationship by virtue of the activity instances being in the same process instance. For example, if an activity instance involved in the incoming cause relationship fails, all subsequent activity instances would not happen.

All BPEL process activity instances are started according to the rules specified in the BPEL process template. Access to such information would facilitate better understanding of the deeper relationships between activity instances, thereby resulting in discovery of "finer" relationships as derived relationships. The general framework of basic and derived relationship construction methodology facilitates modeling that can be observed from the data available, which enables making systematic improvements and refinements as more data become available under often less than ideal real-time conditions and constraints.

A causality tree is a tree of direct and imputed causal relationships triggered by a root causal relationship. Many dynamic relationship types are modeled as a set of states that define the lifecycle phases of the relationship type, and every state transition takes place at a particular point in time. During an analysis, it can be useful to assign timestamps to a relationship vertex based on the timestamps of the relationship links such that a group of vertices can be ordered by their timestamps. If one can determine when a vertex has started, a group of vertices can be sorted by their start times.

An ordered causality tree is a causality tree in which tree siblings are completely ordered by a given vertex ordering scheme.

A multi-layer architecture of an exemplary managed SOA IT environment such as one based on the IBM WebSphere Process Server (WPS) middleware, is depicted in FIG. 3, where business applications are deployed as BPEL business processes, and Web Services are the primary means by which clients communicate with applications, and applications and middleware components communicate with each other. In the IBM WPS implementation business processes, the process execution engine, the Web Service call handler and many other internal components are based upon an industry-standard component software framework called Service Component Architecture (SCA), which defines a standard component software model and a set of inter-component communication protocols and APIs.

Many system runtime monitoring tools such as IBM Tivoli CAM software suite are able to track Web Service calls, SCA component communications via SCA invocations, and BPEL business process and activity execution state changes. External clients send application service requests via Web Service calls, each of which causes a chain of intra-domain and cross-domain causal relationships including the execution of business process activity instances and their causal descendants.

A partial invocation is an invoke relationship for which complete information is not available. In a managed environment, incoming external client Web Service calls will always be partial invocations because the client-side environment is not monitored by the monitoring applications of the managed environment. These partials are represented as invocations with no caller information. This type of partial invocation is known as callee partial. Partial invocations can also be due to the late arrival of data from the monitoring application or error conditions. An ability to track all the events caused by the incoming client service request can provide a complete picture of IT resources utilized and consumed in support of the service request. A complete causal chain of partial invocations is an ordered causality tree. A set of ordered causality trees, each of which is rooted at a partial Web service invocation Callee, are called ordered causality trees for partial invocation Callees.

Figure 15:
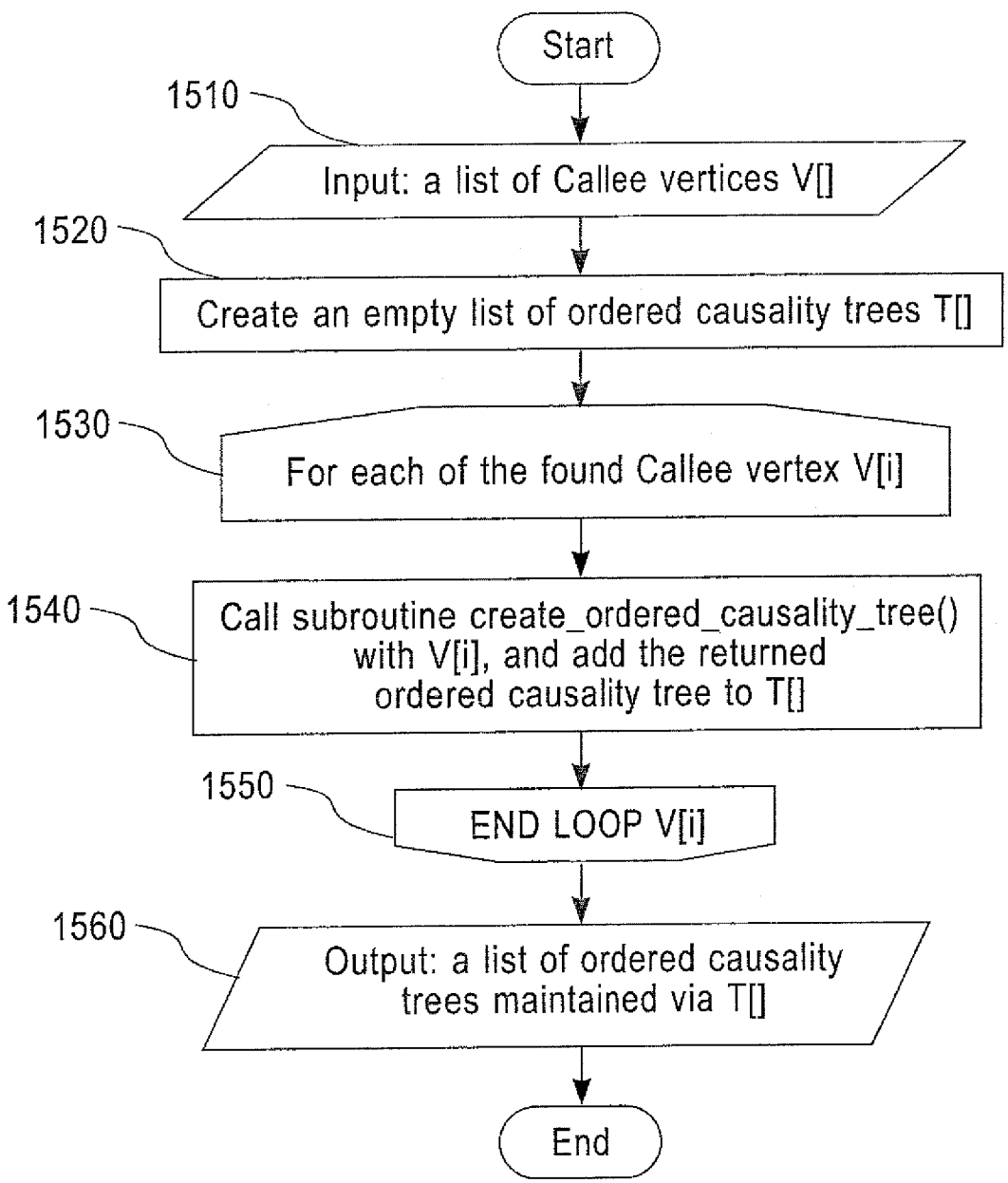
FIG. 15 illustrates a method for determining a set of ordered causality trees for partial invocation Callees.
Figure 16:
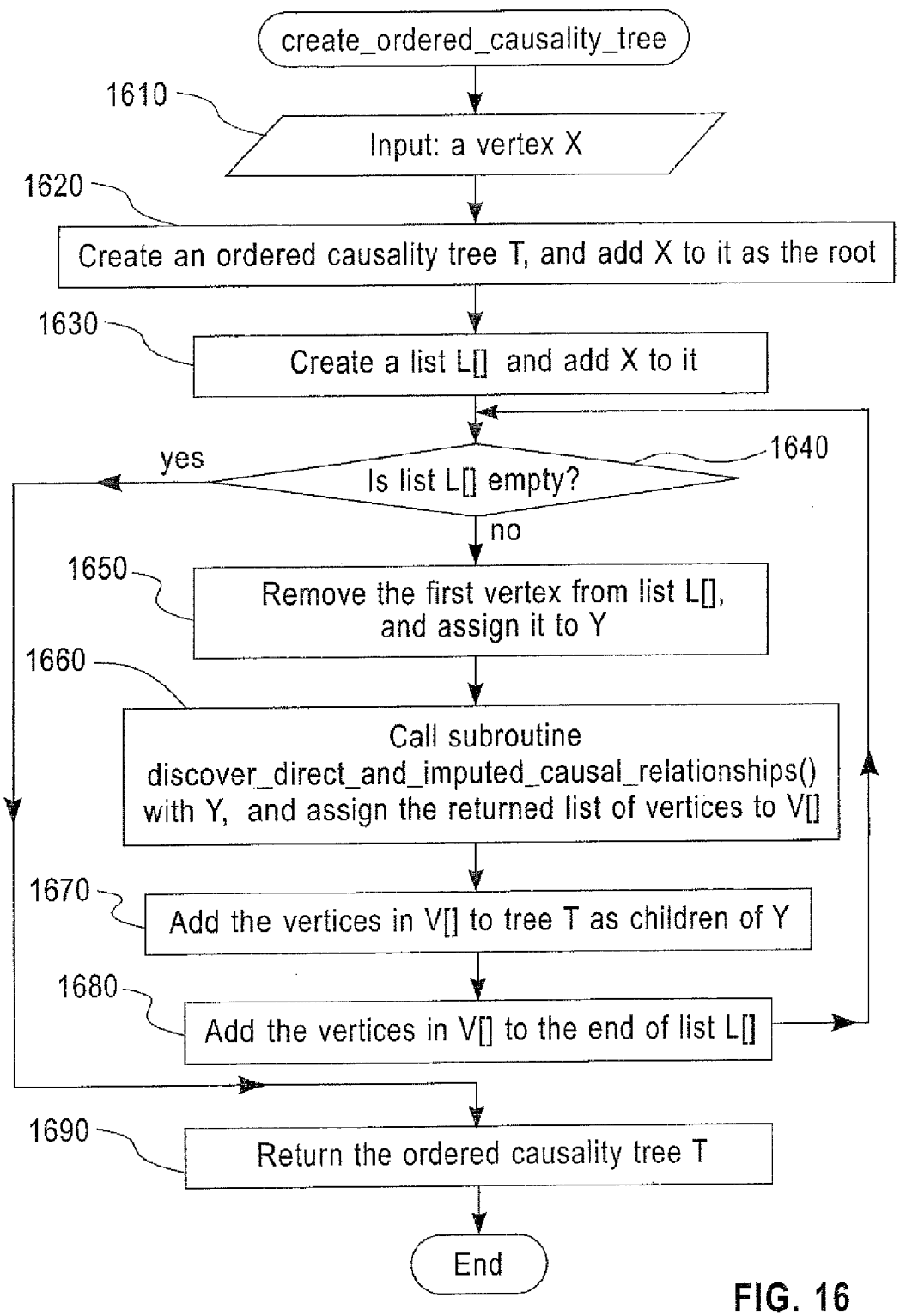
FIG. 16 illustrates a method for determining an ordered causality tree for a given invocation Callee.

FIG. 15 illustrates a method for discovering ordered causality trees for partial invocation Callees. All the Callee partial invokes are first gathered from the CAM-WS Domain relationship data (1510). Then, for each Callee, an ordered causality tree is created with the Callee as the root (1520). For each Callee (1530) an ordered causality tree (1540) is created. The details of the tree creation method are illustrated in FIG. 16. The resulting ordered causality trees are the ordered causality trees for partial invocation Callees (1560).

Figure 17:
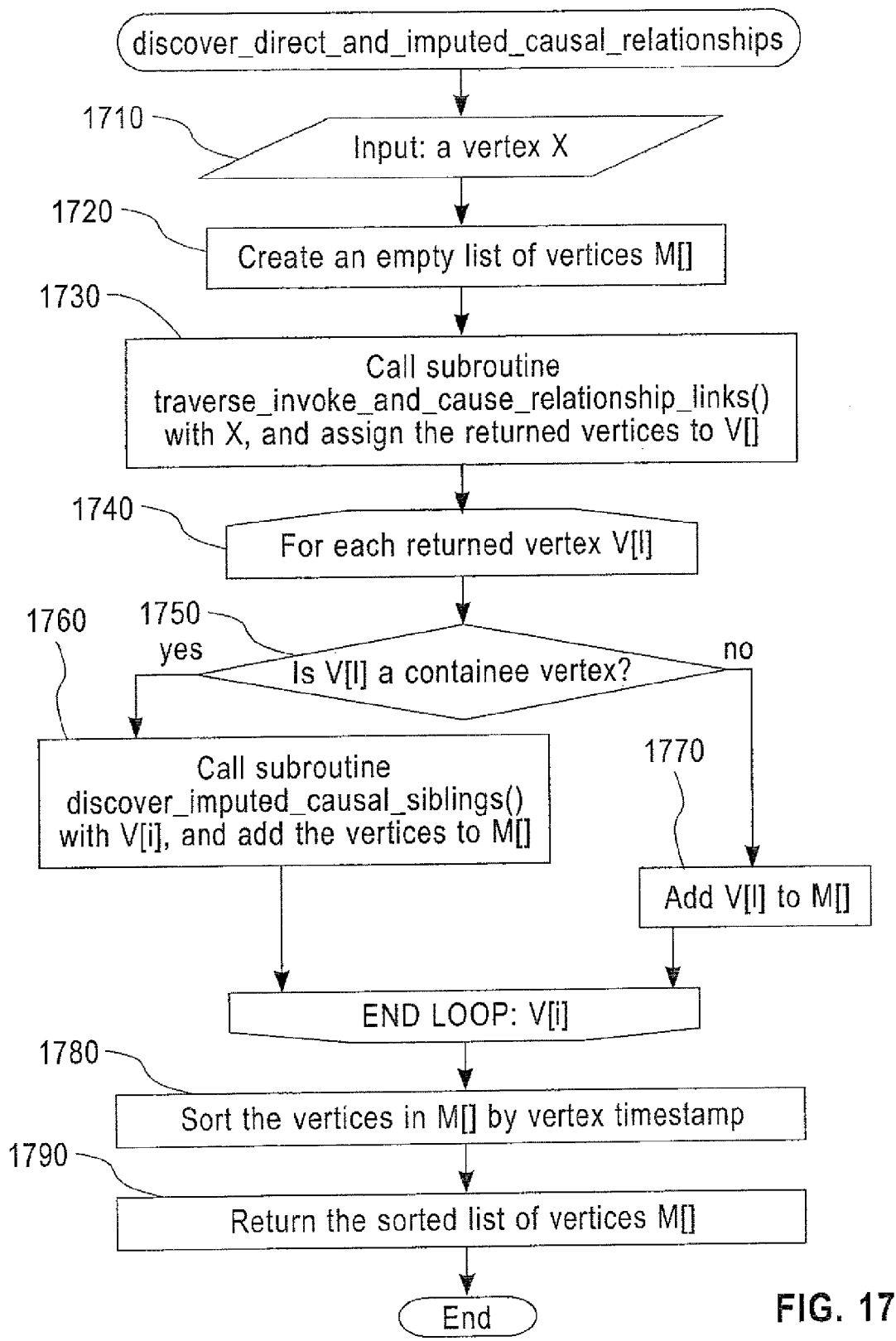
FIG. 17 illustrates a method for determining direct and imputed causal relationships for a given vertex.

FIG. 16 illustrates a method for generating an ordered causality tree for a given input vertex (1610). The method employs a breadth-first search. Starting with the input vertex, a tree is built one level at a time with the vertex as the root (1620). An ordered list of determined but yet-to-be processed vertices (1630) is maintained. For each iteration of the loop (1640) the first unprocessed vertex is chosen from the list (1650) and all the basic relationship links of the vertex are traversed to find causally related vertices (1660). FIG. 17 illustrates a method for determining an ordered list of causally related vertices from the basic relationship links. The determined sorted causal link vertices are added to the tree as children of the chosen vertex (1670). In addition, the newly discovered causal link vertices are appended to the list so that they will be processed in subsequent loop iterations (1680). When no unprocessed vertices are left, the resulting tree is an ordered causality tree rooted at the input vertex (1690).

FIG. 17 illustrates a method for discovering direct and imputed causal relationships for a given vertex. The input is a vertex (1710). First, an empty list of vertices is created to hold the output vertices (1720). From the given input vertex, all direct basic causal links are first traversed, namely invoke and cause (1730). Details for finding direct causal link target vertices can be deduced from FIG. 18. Next, an attempt is made to determine imputed causal links based on the contain relationships. Each direct causal link target vertex is checked to see if it is a Containee of a contain relationship (1740 and 1750). If it is not a Containee, the vertex is added to the output list (1770). If it is a Containee, the same causal relationship is imputed to its contain relationship siblings that were started at later times (1760). Details for determining containment-based imputed causal relationships can be deduced from FIG. 19. Finally, all the direct and imputed causal relationship vertices are merged and sorted by the vertex timestamp (1780) and the result is returned (1790).

Figure 18:
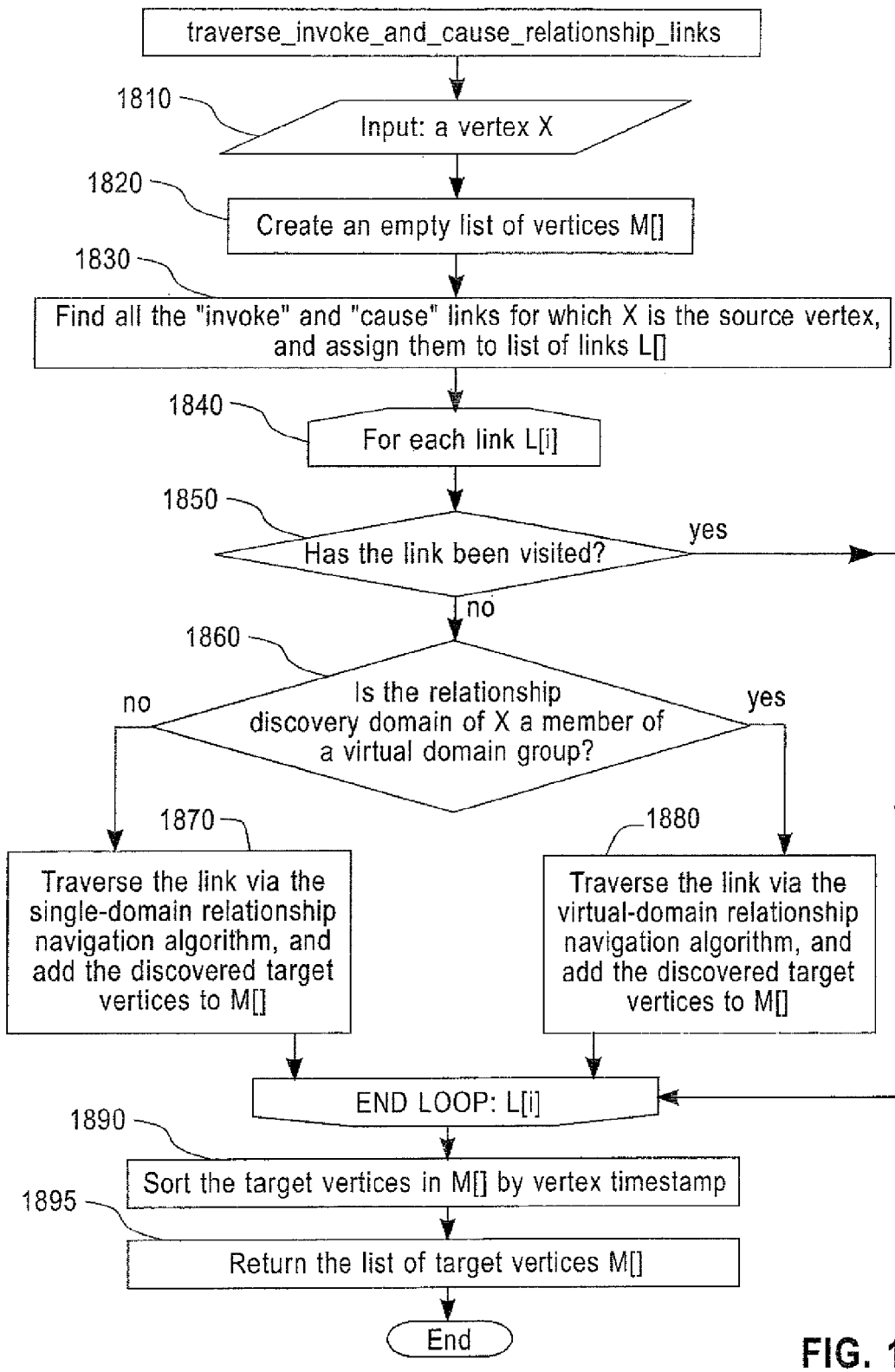
FIG. 18 illustrates a method for traversing invoke and cause relationship links.

FIG. 18 illustrates a method for traversing direct causal links, namely the basic invoke and cause links from a given input vertex. The input is a vertex (1810). An output list of vertices is first created (1820) and the target vertices are found by following the links (1830). Whenever a link has been traversed, a check is performed to determine whether the link has been visited before (1850). Typically, the same relationship link is never visited more than once because the chains of relationships in the basic relationship domains are acyclic. If the domain of the vertex is a member of a virtual domain group (1860) (i.e., a group of discovery domains that are quasi-equally related) the virtual domain relationship navigation algorithm is used to traverse the link (1880). Otherwise, the single domain relationship navigation algorithm is used (1870). Finally, all the collected link target vertices are sorted by the vertex timestamp (1890) and returned (1895).

Figure 19:
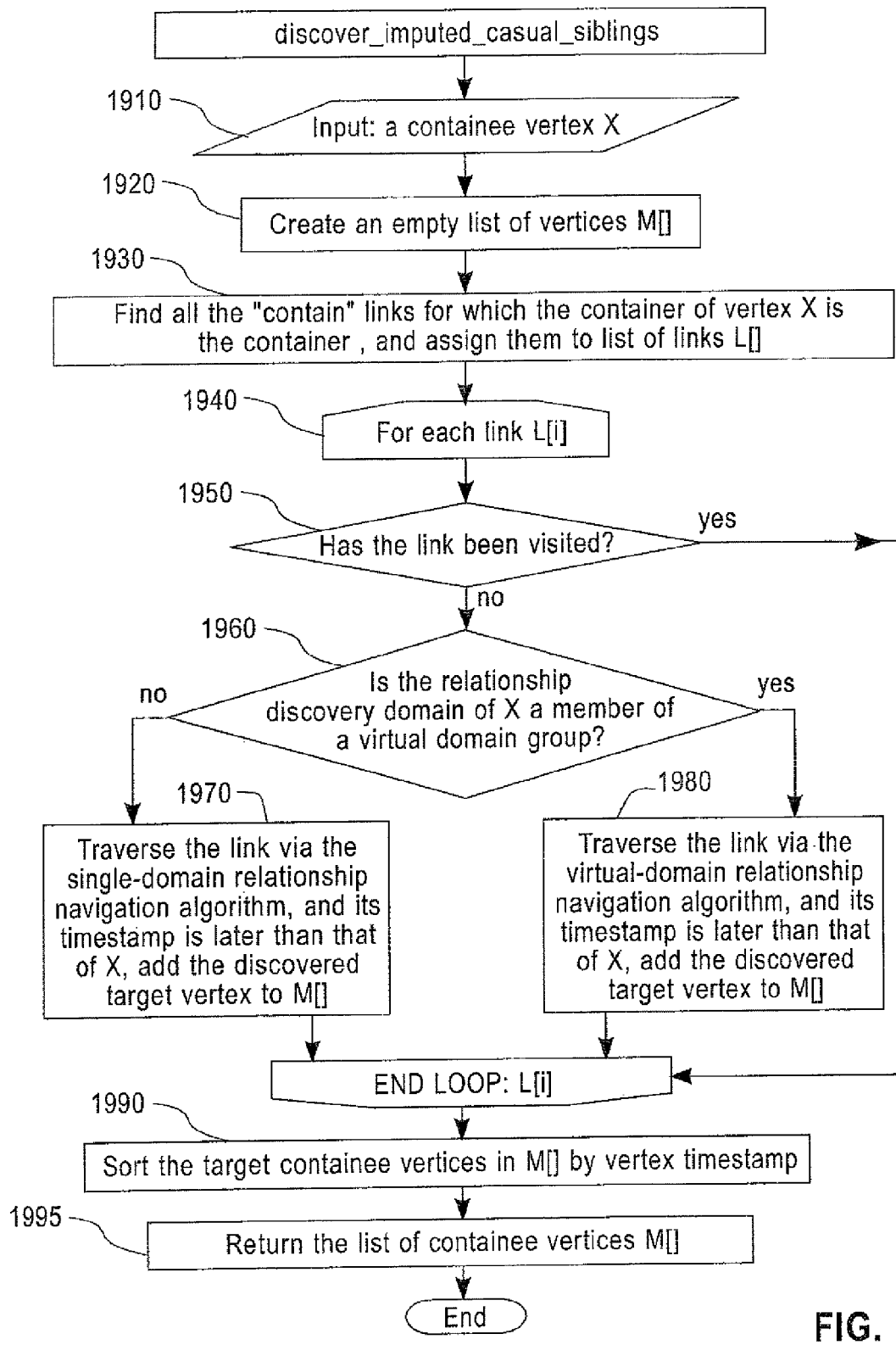
FIG. 19 illustrates a method for discovering imputed causal relationship siblings for a given vertex.

FIG. 19 illustrates a method for finding imputed causal relationship siblings of a Containee vertex. The input is a Containee vertex (1910). As in FIG. 18, an output list of vertices is created (1920), the contain link is followed to find its Container, and then all the contain links are collected from the Container (1930). The links that have been visited before are skipped (1950). The virtual domain link traversal algorithm is used for virtual domain links (1980) and the single domain traversal algorithm for single domain links (1970) to find the target Containees. Only the targets whose timestamp is later than that of the input vertex are added to the output list. Finally, all the found Containee vertices in the output list are sorted by the vertex timestamp (1990) and returned (1995).

Figure 20:
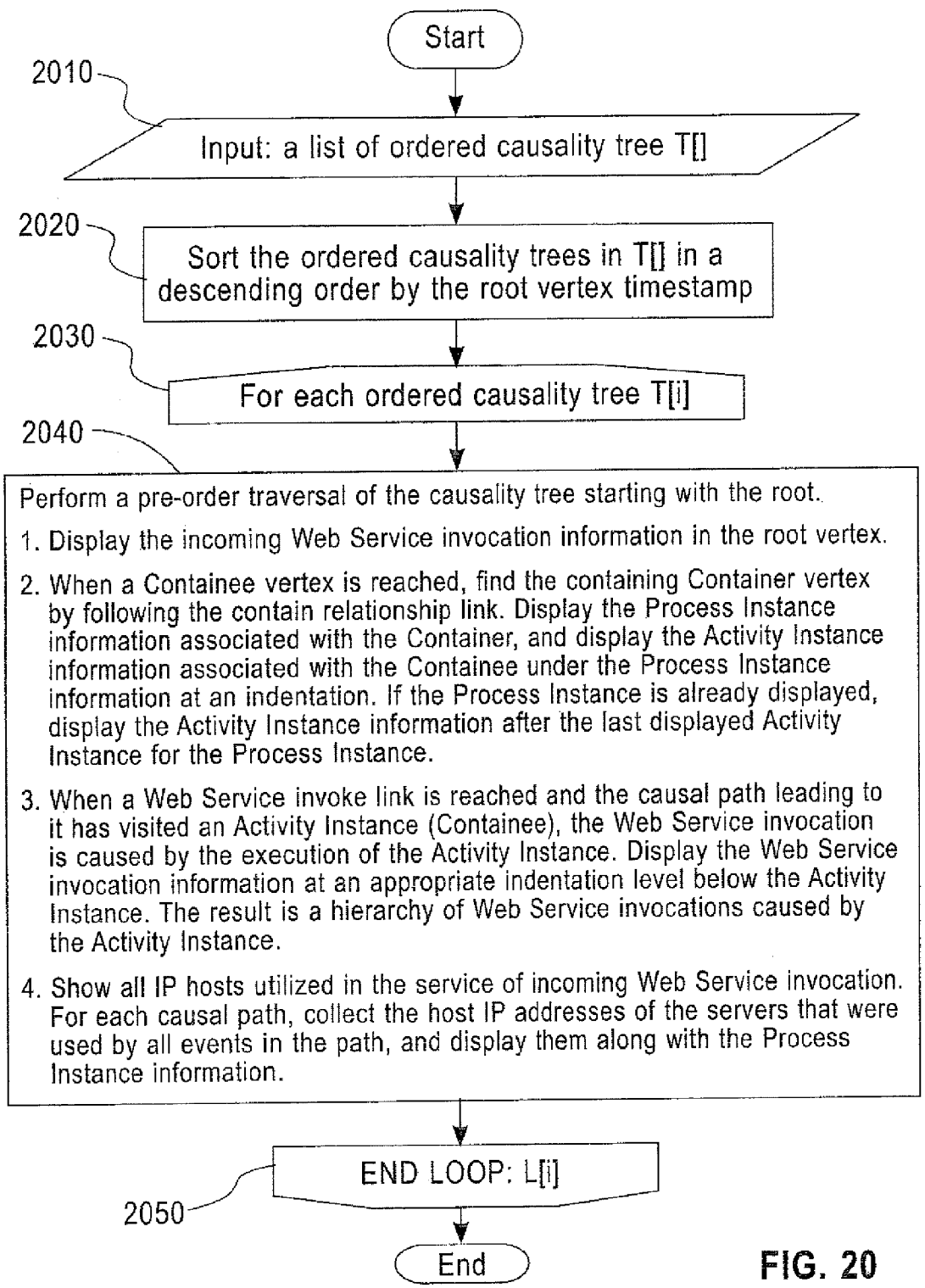
FIG. 20 illustrates a method for displaying output like the screenshot in FIG. 14.

FIG. 20 illustrates a method that could be used to produce display output like the screenshot in FIG. 14. The input is the ordered causality trees for partial invocation Callees (2010). The causality trees are first sorted in a descending order by the root vertex timestamp so that the most recent client requests will be displayed first (2020). For each client request (2030) the corresponding causality tree is traversed and display information about interesting vertices that are encountered is displayed. The traversing of the causality tree is described in step 2040. Starting from the root vertex a pre-order traversal of the tree is performed. In a pre-order traversal, the parent vertex is visited first and then each child sub-tree is visited next. This procedure is repeated recursively until all links have been traversed. The child sub-trees are visited in the order they appear because the child vertices are sorted by the vertex timestamp and they should be visited in a temporal order. For each tree, information about the incoming invocation Callee is first displayed, which is the root of the tree. When a Containee vertex is reached, the corresponding Container vertex is found by following the contain relationship link. The Process Instance information associated with the Container is displayed, and the Activity Instance information associated with the Containee is displayed under the Process Instance information at an indentation. If the Process Instance is already displayed, the Activity Instance information is displayed after the last displayed Activity Instance for the Process Instance. When a Web Service invoke link is reached and the causal path leading to it has visited an Activity Instance (Containee), the Web Service invocation is caused by the execution of the Activity Instance. The Web Service invocation information is displayed at an appropriate indentation level below the Activity Instance. The result is a hierarchy of Web Service invocations caused by the Activity Instance. Finally, while visiting each vertex in the tree, IP addresses of all servers that were utilized are collected in the service of each incoming Web Service invocation. For each causal path, the host IP addresses of the servers that were used by all events in the path are collected, and displayed along with the Process Instance information.

Figure 21:
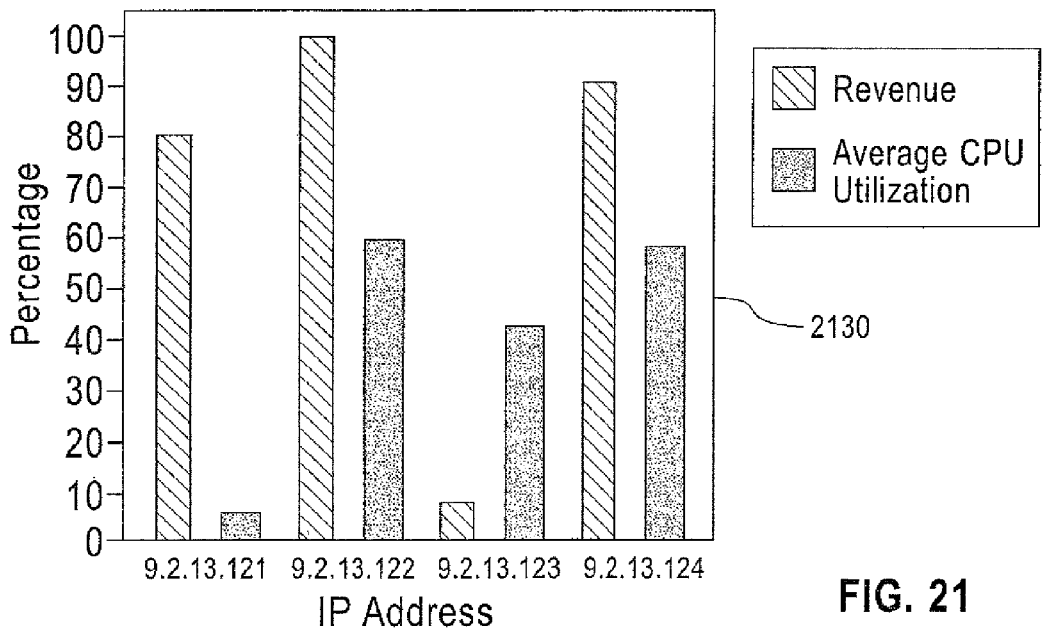
FIG. 21 shows an example of the kinds of business value metrics and IT utilization metrics correlation analyses enabled by at least one embodiment of the present invention.

FIG. 21 shows an example of the kinds of business value metrics and IT utilization metrics correlation analyses enabled by at least one embodiment of the present invention. Business organizations may want to define metrics based on business objectives, and drive IT service utilization and availability management and optimization activities in business terms. FIG. 21 is a snapshot of the display from a real-time business metric and host utilization correlation analyzer application that continuously updates the analysis results at every 60 minute evaluation interval. Table 2110 summarizes the total number of business transactions and the total generated revenue units in the last evaluation interval. For each process type, it displays the number of completed instances (business transactions), the number and the percentage of qualified instances, and the generated revenue units. Table 2120 shows the details of the business impact metric used in this simulation run. For example, each instance of the OrderFulfillmentProcess business process generates 3 units of revenue when the response time is within the 85-second target. Similarly, revenue units of 10 and 28-second response time threshold are defined for the TravelBookingService process. A host-based analysis was also performed 2130. During the evaluation interval, the average CPU utilization for each host (server) and the host's impact on business in terms of the percentage of the total generated revenue were computed. This type of analysis is possible because the present invention enables one to relate business transactions and their business impact to the IT resources.

The business impact values of all qualified business process instances are propagated and summed for all utilized hosts. The bar chart 2130 shows the revenue contribution and the average CPU utilization for each of the four hosts in the managed environment. A pair of bars is shown for each host. The first bar is the host's relative contribution to revenue, and the second bar is the average CPU utilization. The chart illustrates that the utilization of IT resources does not necessarily correlate with the impact on business they have. For example, the first host had a significant business impact but is under utilized. In contrast, the third host had little business impact, while the CPU utilization was relatively high.

Figure 22:
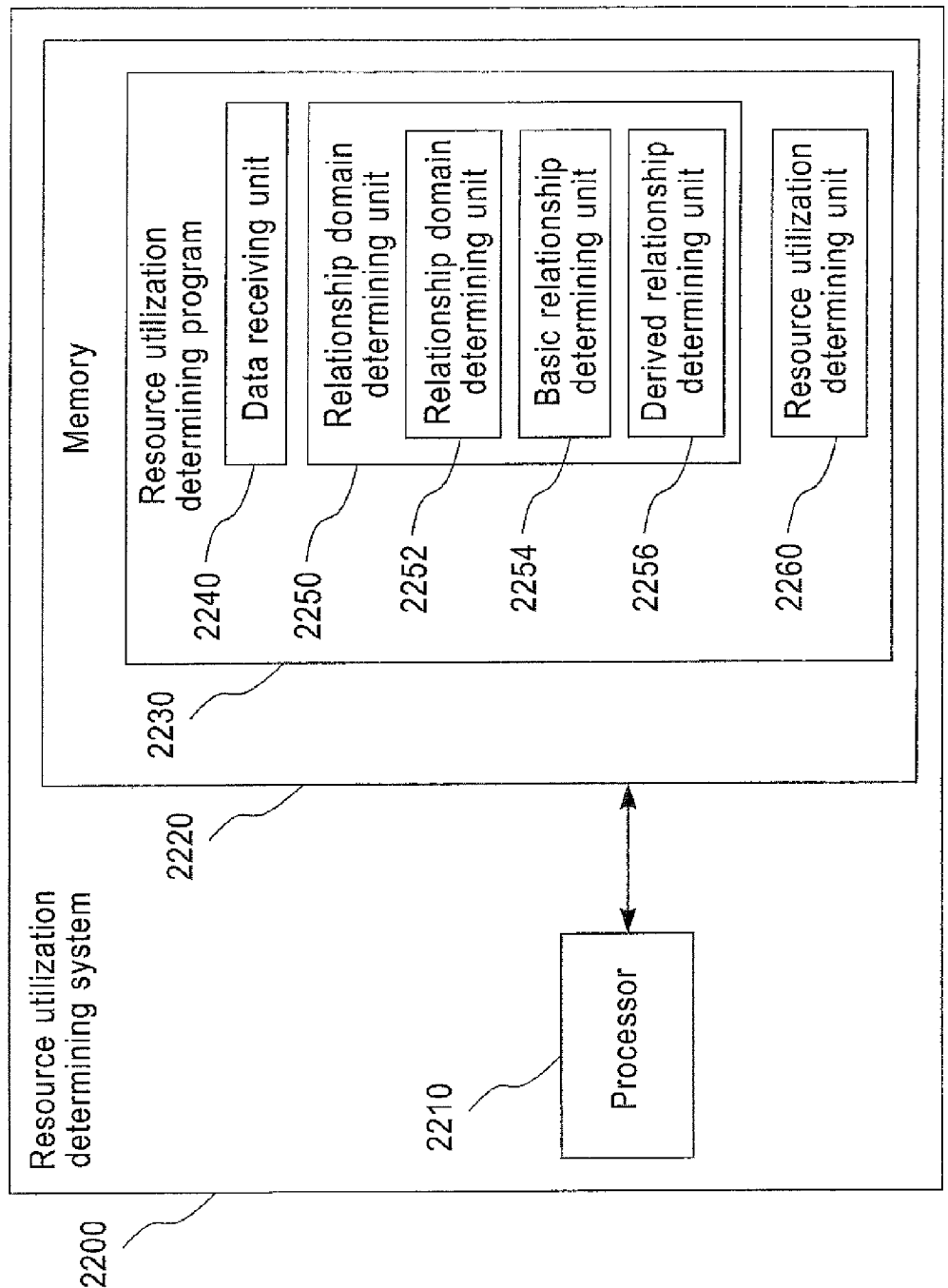
FIG. 22 is a high-level block diagram of a resource utilization determining system according to an exemplary embodiment of the present invention.

FIG. 22 illustrates a high-level block diagram of a resource utilization determining system according to an exemplary embodiment of the present invention. The resource utilization determining system 2200 includes a processor 2210, a memory 2220, and a resource utilization determining program 2230. The resource utilization determining program 2230 is stored in the memory 2220 and is executed by the processor 2210. The resource utilization determining program 2230 includes a data receiving unit 2240, a relationship domain determining unit 2250, and a resource utilization determining unit 2260. The data receiving unit 2240 receives data from one or more different monitoring applications. The relationship determining unit 2250 determines relationships from the monitoring data. The resource utilization determining unit 2260 determines resources utilized by a service request of a data processing system from the relationships. The relationship determining unit 2250 may include a relationship domain determining unit 2252, a basic relationship determining unit 2254, and a derived relationship determining unit. The relationship domain determining unit 2252 determines relationship domains for each relationship type in the monitoring data that is monitored by one of the monitoring applications. The basic relationship determining unit 2254 determines intra-domain relationships of each of the relationship domains. The derived relationship determining unit 2256 determines cross-domain relationships between pairs of the relationship domains.

The resource utilization determining system 2200 may include a network interface to communicate with the data processing system across a network. The resource utilization determining program 2230 may include an optimization unit to optimize the data processing system using information about the resources utilized by the service request. The data receiving unit 2240 may include data adapters to each receive a stream of the monitoring data. Units of the resource utilization determining system 2200 may communicate with each other using a publisher-subscriber model. The resource utilization determining system 2200 may further include a publishing unit which provides information about the resources utilized by the service request to a subscriber of the resource utilization determining system 2200.

Figure 23:
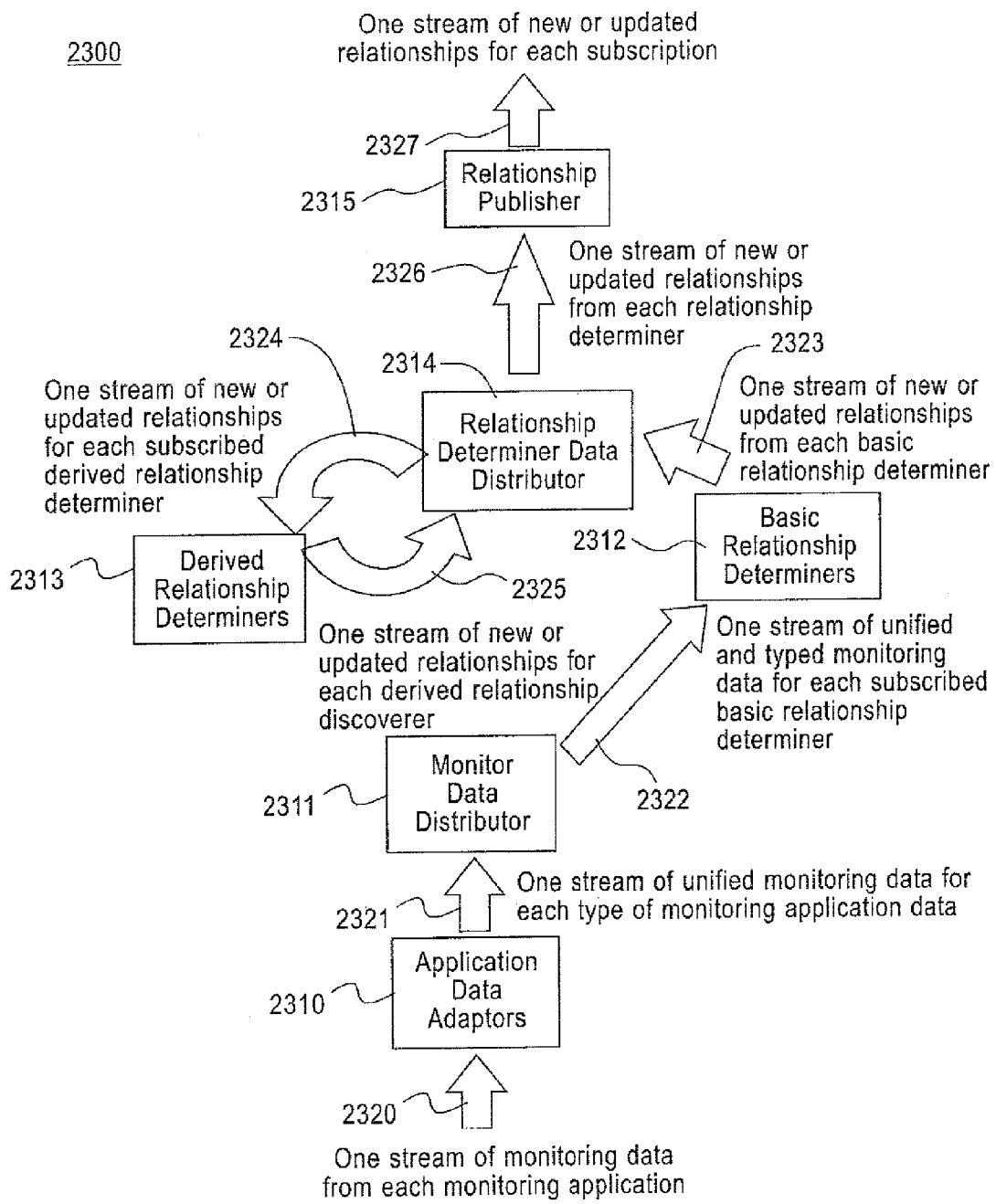
FIG. 23 is a block diagram depicting a system for real-time relationship determining based on a data streaming model according to an exemplary embodiment of the present invention.

FIG. 23 is a block diagram showing an on-demand relationship determining system based on a data streaming model and a pub-sub data distribution model, according to an exemplary embodiment of the present invention. The system 2300 essentially receives one stream of monitoring data from each monitoring application, and publishes one stream of discovered relationships to each subscriber of the system. The system 2300 includes multiple Application Data Adaptors 2310, one Monitor Data Distributor 2311, multiple Basic Relationship Determiners 2312, multiple Derived Relationship Determiners 2313, a Relationship Data Distributor 2314 and a Relationship Publisher 2315.

When the monitoring data gathered by one specific monitoring application is continuously sent to the system 2300 in real time 2320, there exists an Application Data Adaptor that (1) transforms the data format as per a unified monitoring data representation scheme, (2) groups the components of each data item into one or more monitoring data types as per pre-defined monitored relationship types, and (3) sends 2321 streams of typed monitoring data to a Monitor Data Distributor 2311. The Monitor Data Distributor 2311 contains subscriptions to those streams of unified and typed monitoring data from Basic Relationship Determiners, and distributes 2322 one stream of those data for each subscription. Each Basic Relationship Determiner 2312 determines basic relationships, and sends 2323 one stream of new or updated relationship data to the Relationship Determiner Data Distributor 2314. The Relationship Determiner Data Distributor 2314 receives streams 2323 and 2325 of relationship data from all of the Basic Relationship Determiners 2312 and Derived Relationship Determiners 2313, and forwards 2326 them to Relationship Publisher 2315. It also contains subscriptions to those streams from the Derived Relationship Determiners 2313, and distributes one stream 2324 of relationship data for each subscription. This pub-sub scheme allows a Derived Relationship Determiner to implement a relationship determining method that uses the relationship data produced by other relationship determiners. The Relationship Publisher 2315 contains subscriptions to the published streams of relationship data from clients, and distributes one stream 2327 of new or updated relationships for each subscription.

It is to be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the invention. Accordingly, the protection sought herein is as set forth in the claims below.

What is claimed is:

1. A data processing system to determine resource utilization, the system comprising:
    a processor;
    a memory; and
    a computer program stored in the memory, the program comprising instructions to:
    receive monitoring data from each of a plurality of different monitoring applications;
    determine containment and invocation relationships from the monitoring data,
    wherein the containment relationships indicate whether each of a plurality of first data objects is contained within another one of the first data objects to identify at least one containee or whether the corresponding first data object contains another one of the first data objects to identify at least one container,
    wherein the invocation relationships indicate whether each of a plurality of second data objects is calling another one of the second data objects to identify at least one caller or whether the corresponding second data object is being called by another one of the second data objects to identify at least one callee;
    determine resources utilized by a service request of the data processing system from the determined containment and invocation relationships by deriving server identity information for the containers, callers, callees, and the containees from the monitoring data, and determining CPU usage information from servers corresponding to the derived server identity information; and
    optimize the data processing system using the CPU usage information,
    wherein the processor executes the resource utilization determining program.

2. The system of claim 1, further comprises a network interface to communicate with the data processing system across a network.

3. The system of claim 1, wherein the program further comprises instructions to:
    determine relationship domains for each relationship type in the monitoring data that is monitored by one of the monitoring applications;
    determine intra-domain relationships from the relationship domains; and
    determine cross-domain relationships between pairs of the relationship domains.

4. The system of claim 1, wherein the program comprises application data adapters to each receive a stream of the monitoring data.

5. The system of claim 1, wherein the program communicates with an external subscriber using a publisher-subscriber model.

6. The system of claim 5, wherein the program further comprises an instruction to provide information about the resources utilized by the service request to the subscriber of the system.

7. The system of claim 3, wherein determining cross-domain relationships comprises:
    selecting a pair of the relationship domains;
    identifying cross-callers and cross-callees among the selected pair of relationship domains from the monitoring data; and
    determining cross-causal relationships between the cross-callees and the cross-callers.

8. The system of claim 3, wherein determining cross-domain relationships further comprises determining quasi-equal relationships from the cross-causal relationships that correspond to the relationship domains that are based on a same one of the relationship types.

9. A computer-implemented method for determining resources utilized by a service request in a data processing system, the method comprising:
    receiving monitoring data from each of a plurality of different monitoring applications;
    determining containment and invocation relationships from the monitoring data,
    wherein the containment relationships indicate whether each of a plurality of first data objects is contained within another one of the first data objects to identify at least one containee or whether the one first data object contains another one of the first data objects to identify at least one container,
    wherein the invocation relationships indicate whether each of a plurality of second data objects is calling another one of the second data objects to identify at least one caller or whether the corresponding second data object is being called by another one of the second data objects to identify at least one callee;
    determining resources utilized by a service request of the data processing system from the determined containment and invocation relationships by deriving server identity information for the containers, callers, callees and the containees from the monitoring data, and determining CPU usage information from servers corresponding to the derived server identity information; and
    optimizing the data processing system using the CPU usage information.

10. A program storage device readable by machine, tangibly embodying a program of instructions executable by the machine to perform method steps for determining resources utilized by a service request in a data processing system, the method steps comprising:
- receiving monitoring data from each of a plurality of different monitoring applications;
- determining containment and invocation relationships from the monitoring data,
- wherein the containment relationships indicate whether each of a plurality of first data objects is contained within another one of the first data objects to identify at least one containee or whether the one first data object contains another one of the first data objects to identify at least one container,
- wherein the invocation relationships indicate whether each of a plurality of second data objects is calling another one of the second data objects to identify at least one caller or whether the corresponding second data object is being called by another one of the second data objects to identify at least one callee;
- determining resources utilized by a service request of the data processing system from the determined containment and invocation relationships by deriving server identity information for the containers, callers, callees and the containees from the monitoring data, and determining CPU usage information from servers corresponding to the derived server identity information; and
- optimizing the data processing system using the CPU usage information.

* * * * *